US012777044B2

(12) United States Patent
Petersen et al.

(10) Patent No.: US 12,777,044 B2
(45) **Date of Patent: *Oct. 27, 2026**

(54) NETWORK-LEVEL USER VALIDATION FOR NETWORK-BASED EXCHANGES THAT LEVERAGES UNIQUE EPHEMERAL KEY TO ELIMINATE USE OF CREDENTIALS

(71) Applicant: 1080 Network, Inc., Lakeway, TX (US)

(72) Inventors: Christopher Petersen, Lakeway, TX (US); Tim Kuchlein, Lakeway, TX (US)

(73) Assignee: 1080 Network, Inc., Lakeway, TX (US)

( * ) Notice: Subject to any disclaimer, the term of this patent is extended or adjusted under 35 U.S.C. 154(b) by 316 days.

This patent is subject to a terminal disclaimer.

(21) Appl. No.: 18/652,359

(22) Filed: May 1, 2024

(65) Prior Publication Data

US 2024/0356929 A1 Oct. 24, 2024

Related U.S. Application Data

(63) Continuation of application No. 18/343,438, filed on Jun. 28, 2023, now Pat. No. 11,997,105.

(Continued)

(51) Int. Cl.
*H04L 9/40* (2022.01)
*H04W 12/0471* (2021.01)

(52) U.S. Cl.
CPC .......... *H04L 63/105* (2013.01); *H04L 63/061* (2013.01); *H04W 12/0471* (2021.01)

(58) Field of Classification Search
None
See application file for complete search history.

(56) References Cited

U.S. PATENT DOCUMENTS 7,310,608 B2 12/2007 Nakajima et al.
10,169,587 B1 1/2019 Nix
(Continued)

FOREIGN PATENT DOCUMENTS

CN 101506820 A 8/2009
CN 107103469 A 8/2017
(Continued)

OTHER PUBLICATIONS

Cambridge Dictionary, definition of "unique," Nov. 11, 2020 (Year: 2020).
(Continued)

*Primary Examiner* — Haris Sabah
(74) *Attorney, Agent, or Firm* — Alston & Bird LLP

(57) ABSTRACT

Various embodiments of the present disclosure provide techniques for adjudicating a credential-less exchange over a network using a plurality of identifier mappings and member interfaces. The techniques may include receiving an exchange request for executing a value-based exchange that includes a universally unique ephemeral key (UUEK) and identifies an object. The techniques may include identifying a user and an instrument for servicing the exchange request based on the UUEK. The techniques may include determining validated and invalidated objects for the exchange request based on the user and providing an exchange authorization request indicative of the validated objects to a member platform associated with the instrument. The techniques may include receiving an exchange authorization response indicating whether the exchange request is approved by the member platform and replying to the exchange request with an exchange response that is reflective of the exchange authorization response and the invalidated objects.

20 Claims, 8 Drawing Sheets

Related U.S. Application Data

(60) Provisional application No. 63/370,274, filed on Aug. 3, 2022.

(56) References Cited

U.S. PATENT DOCUMENTS

| | | | |
|---|---|---|---|
| 11,153,080 B1 * | 10/2021 | Nix | H04L 9/3093 |
| 2002/0147678 A1 | 10/2002 | Drunsic | |
| 2006/0149626 A1 | 7/2006 | Bennett et al. | |
| 2006/0149670 A1 | 7/2006 | Nguyen et al. | |
| 2010/0145810 A1 | 6/2010 | Pourfallah et al. | |
| 2012/0130783 A1 | 5/2012 | Hogg et al. | |
| 2013/0024364 A1 | 1/2013 | Shrivastava et al. | |
| 2013/0290121 A1 | 10/2013 | Simakov et al. | |
| 2013/0311369 A1 | 11/2013 | Elrod et al. | |
| 2014/0279474 A1 | 9/2014 | Evans et al. | |
| 2015/0127476 A1 | 5/2015 | Skiba et al. | |
| 2016/0182497 A1 | 6/2016 | Smith | |
| 2016/0335634 A1 | 11/2016 | Flood | |
| 2017/0208062 A1 | 7/2017 | Morikawa et al. | |
| 2018/0047024 A1 | 2/2018 | Niehaus | |
| 2018/0176211 A1 * | 6/2018 | Bernabeu | H04W 12/50 |
| 2019/0251565 A1 | 8/2019 | Mullaney et al. | |
| 2019/0356482 A1 | 11/2019 | Nix | |
| 2020/0092269 A1 | 3/2020 | Le Saint et al. | |
| 2020/0280436 A1 * | 9/2020 | Nix | H04L 9/0618 |
| 2020/0322135 A1 | 10/2020 | Kupwade Patil et al. | |
| 2021/0090066 A1 * | 3/2021 | Beye | G06Q 20/02 |
| 2021/0295367 A1 | 9/2021 | Wald | |
| 2022/0051204 A1 | 2/2022 | Diaz et al. | |
| 2022/0070001 A1 | 3/2022 | Le Saint et al. | |
| 2022/0131709 A1 | 4/2022 | Nix | |
| 2022/0237617 A1 | 7/2022 | Dutt et al. | |
| 2023/0208644 A1 | 6/2023 | Fitzpatrick et al. | |
| 2024/0046261 A1 | 2/2024 | Petersen et al. | |

FOREIGN PATENT DOCUMENTS

| | | | |
|---|---|---|---|
| CN | 113711258 | A | 11/2021 |
| JP | 2001-067396 | A | 3/2001 |
| JP | 2002-074223 | A | 3/2002 |
| JP | 2002-342688 | A | 11/2002 |
| WO | 2014/011691 | A1 | 1/2014 |

OTHER PUBLICATIONS

Merriam-Webster Dictionary, definition of "unique," May 16, 2022 (Year: 2022).

Applicant-Initiated Interview Summary Record (PTOL-413) Mailed on Jun. 28, 2024 for U.S. Appl. No. 18/343,433, 2 page(s).

Final Rejection Mailed on Jul. 30, 2024 for U.S. Appl. No. 18/343,433, 37 page(s).

ISA/220—Notification of Transmittal or Search Report and Written Opinion of the ISA, or the Declaration Mailed on Dec. 8, 2023 for WO Application No. PCT/US23/071571, 1 page(s).

ISA/220—Notification of Transmittal or Search Report and Written Opinion of the ISA, or the Declaration Mailed on Nov. 20, 2023 for WO Application No. PCT/US23/071576, 1 page(s).

Non-Final Rejection Mailed on Mar. 4, 2024 for U.S. Appl. No. 18/343,438, 10 page(s).

Non-Final Rejection Mailed on Mar. 28, 2024 for U.S. Appl. No. 18/343,433, 29 page(s).

Notice of Allowance and Fees Due (PTOL-85) Mailed on Apr. 3, 2024 for U.S. Appl. No. 18/343,438, 11 page(s).

Outgoing—ISA/210—International Search Report Mailed on Dec. 8, 2023 for WO Application No. PCT/US23/071571, 2 page(s).

Outgoing—ISA/210—International Search Report Mailed on Nov. 20, 2023 for WO Application No. PCT/US23/071576, 2 page(s).

Outgoing Written Opinion of the ISA Mailed on Dec. 8, 2023 for WO Application No. PCT/US23/071571, 4 page(s).

Outgoing Written Opinion of the ISA Mailed on Nov. 20, 2023 for WO Application No. PCT/US23/071576, 4 page(s).

The Quick Guide to GUIDs, Apr. 6, 2022, Better Explained, retrieved from: https://web.archive.org/web/20220406020254/https://betterexplained.com/articles/the-quick-guide-to-guids/ (Year:2022).

* cited by examiner

NETWORK-LEVEL USER VALIDATION FOR NETWORK-BASED EXCHANGES THAT LEVERAGES UNIQUE EPHEMERAL KEY TO ELIMINATE USE OF CREDENTIALS

CROSS-REFERENCE TO RELATED APPLICATIONS

This application is a continuation of U.S. patent application Ser. No. 18/343,438 filed on Jun. 28, 2023, which claims priority to U.S. Provisional Patent Application No. 63/370,274 filed on Aug. 3, 2022, both of which are incorporated herein by reference in their entireties, including any figures, tables, drawings, and appendices.

TECHNOLOGICAL FIELD

Embodiments of the present disclosure generally relate to credential-less exchanges of value between multiple entities in a value system.

BACKGROUND

Various embodiments of the present disclosure address technical challenges related to network-based value exchanges given limitations of existing exchange processing techniques and architectures. Existing processes for executing an exchange over a computing network rely on the use of persistent credentials, such as payment credentials (e.g., card numbers, usernames, passwords, bank routing numbers, account numbers, etc.) and their proxies, which expose recipients of the credentials to fraud, regulatory and compliance costs, and reputational risk. Moreover, due to the static nature of traditional credentials, users must accept risk of financial loss, damaged credit scores, identity theft, and other outcomes each time the user provides their credentials to enable a transaction. The inherent insecurity of persistent credentials is conventionally addressed using strict communication protocols, data governance procedures, and authentication schemes, each of which introduce additional technical problems by adding overhead and complicating network-based transactions without solving the root technical problem of data security.

For example, traditional service providers that manage user accounts may limit their exposure using disclaimers that prevent users from providing their credentials to certain third parties. This leads to network congestion as a limited number of approved parties are overloaded by requests across a population. Moreover, approved parties are required to enroll a user by obtaining sensitive, persistent credentials (e.g., username, passwords, routing/transit credentials, etc.) from the user and then subsequently manage a robust number of persistent credentials across a number of enrolled users. This presents a single attack vector for malicious parties to obtain sensitive user information for a population of users. To counter such attacks, traditional transaction processing entities are required to adopt costly, resource intensive, and robust data governance procedures and authentication schemes that are imperfect and still subject to infiltration.

Other techniques for addressing data security include limiting exchange communications, such as those for financial transactions, to strict messaging standards, such as ISO messaging standards, which are inflexible and, by design, unable to provide contextual data, such as object identifiers, for transactions. By doing so, these techniques prevent the validation of object-level attributes involved in an exchange, among other functionalities, that would otherwise provide seamless network-based exchanges. For example, traditional exchange networks lack the ability to (i) pass object-level details and (ii) record user information and, therefore, lack the ability to adjudicate individual objects involved in an exchange request as acceptable for a particular user involved in a value-based exchange. Accordingly, traditional approaches for handling restrictions to value-based exchanges require the restrictions to be handled at point of sale systems and rely on manual intervention, which may be unreliable, unsafe, and time consuming. For example, traditional exchange networks lack the ability to verify age details of a user initiating an exchange and rely on representatives of an establishment to request a form of identification from a user and be trained to assess the validity of the identification for a particular purchase. Thus, by using such communication standards traditional exchange networks increase network security at the cost of exchange functionality.

Various embodiments of the present disclosure make important contributions to various existing network-based exchange processing techniques by addressing each of these technical challenges.

BRIEF SUMMARY

Various embodiments of the present disclosure disclose a secure intermediary computing platform and computing services that facilitate the credential-less execution of a value-based exchange that leverages UUEK (Universally Unique Ephemeral Key) to eliminate the use of persistent credentials. To do so, the intermediary computing platform may facilitate interactions between one or more member platforms to enroll a user instrument in a value exchange system that is powered by a new, ephemeral data structure referred to herein as an UUEK. Unlike conventional exchange systems, the intermediary computing platform does not receive or rely upon persistent user or instrument credentials to register a user's instrument. The elimination of such credentials enables the use of new, more flexible, interfaces, such as application programming interfaces (APIs) described herein, that are leveraged by the intermediary computing platform to communicate with different network members to register a user, a user's instrument, and instrument policies, without exposing user credentials at any step in the process. Once registered, the intermediary computing platform may issue UUEKs to a member platform that may replace traditional, persistent credentials. The issued UUEKs are not reflective of persistent credentials or any other sensitive user or instrument information. Interfaces between a member platforms and the intermediary platform may allow (i) a user to present the issued UUEK (without explicit reference to a persistent credential) from a member platform to an intermediate platform and (ii) the intermediary platform to map the issued UUEK to instrument keys for the same or another member platform and provide the instrument keys to the member platform to authorize a value-based exchange. In this way, network-based transactions may be authorized in a seamless process without exposing sensitive user or instrument information that may be susceptible to network attacks.

By doing so, some of the techniques of the present disclosure enable the use of flexible interfaces, such as APIs, between entities of a value-based exchange. These interfaces may enable requests and/or responses between the entities that allow the transfer of contextual information, such as object identifiers, during the execution of a value-based exchange. In this way, the execution of a value-based exchange may be predicated based at least in part on the adjudication of object-level details of the value-based exchange. As described herein, this allows for the enforcement of user-specific restrictions, such as age restrictions, and/or the like, by an intermediary platform, without risk of exposing sensitive user or financial information. Ultimately, the techniques of the present disclosure enable additional flexibility (e.g., through the use of new interfaces, etc.) and security (e.g., through the elimination of persistent credentials, etc.), while reducing computing power requirements and enabling significantly greater network throughput for exchange processing relative to traditional techniques.

In some embodiments, a computer-implemented method includes receiving, by one or more processors and using a partner interface, an exchange request for executing a value-based exchange, wherein the exchange request is indicative of a universally unique ephemeral key (UUEK) that includes an exchange identifier; identifying, by the one or more processors, an exchange data object based at least in part on the exchange identifier, wherein the exchange data object includes (i) an instrument identifier for a service provider instrument of a member platform and (ii) a user identifier for a user associated with the service provider instrument; determining, by the one or more processors, one or more validated objects and one or more invalidated objects for the exchange request based at least in part on one or more user attributes corresponding to the user; providing, by the one or more processors and using a service provider interface, an exchange authorization request to the member platform, wherein the exchange authorization request is indicative of the instrument identifier and the one or more validated objects for the exchange request; receiving, by the one or more processors and using the service provider interface, an exchange authorization response that is indicative of at least one of an exchange approval or an exchange denial; and providing, by the one or more processors and using the partner interface, an exchange response based at least in part on the exchange authorization response, wherein the exchange response is indicative of (i) the exchange approval or the exchange denial and (ii) the one or more invalidated objects for the exchange request.

In some embodiments, a computing system includes a memory and one or more processors communicatively coupled to the memory. The one or more are processors configured to receive, using a partner interface, an exchange request for executing a value-based exchange, wherein the exchange request is indicative of a universally unique ephemeral key (UUEK) that includes an exchange identifier; identify an exchange data object based at least in part on the exchange identifier, wherein the exchange data object includes (i) an instrument identifier for a service provider instrument of a member platform and (ii) a user identifier for a user associated with the service provider instrument; determine one or more validated objects and one or more invalidated objects for the exchange request based at least in part on one or more user attributes corresponding to the user; provide, using a service provider interface, an exchange authorization request to the member platform, wherein the exchange authorization request is indicative of the instrument identifier and the one or more validated objects for the exchange request; receive, using the service provider interface, an exchange authorization response that is indicative of at least one of an exchange approval or an exchange denial; and provide, using the partner interface, an exchange response based at least in part on the exchange authorization response, wherein the exchange response is indicative of (i) the exchange approval or the exchange denial and (ii) the one or more invalidated objects for the exchange request.

In some embodiments, one or more non-transitory computer-readable storage media includes instructions that, when executed by one or more processors, cause the one or more processors to receive, using a partner interface, an exchange request for executing a value-based exchange, wherein the exchange request is indicative of a universally unique ephemeral key (UUEK) that includes an exchange identifier; identify an exchange data object based at least in part on the exchange identifier, wherein the exchange data object includes (i) an instrument identifier for a service provider instrument of a member platform and (ii) a user identifier for a user associated with the service provider instrument; determine one or more validated objects and one or more invalidated objects for the exchange request based at least in part on one or more user attributes corresponding to the user; provide, using a service provider interface, an exchange authorization request to the member platform, wherein the exchange authorization request is indicative of the instrument identifier and the one or more validated objects for the exchange request; receive, using the service provider interface, an exchange authorization response that is indicative of at least one of an exchange approval or an exchange denial; and provide, using the partner interface, an exchange response based at least in part on the exchange authorization response, wherein the exchange response is indicative of (i) the exchange approval or the exchange denial and (ii) the one or more invalidated objects for the exchange request.

BRIEF DESCRIPTION THE DRAWINGS

Having thus described the disclosure in general terms, reference will now be made to the accompanying drawings, which are not necessarily drawn to scale, and wherein:

Figure 6:
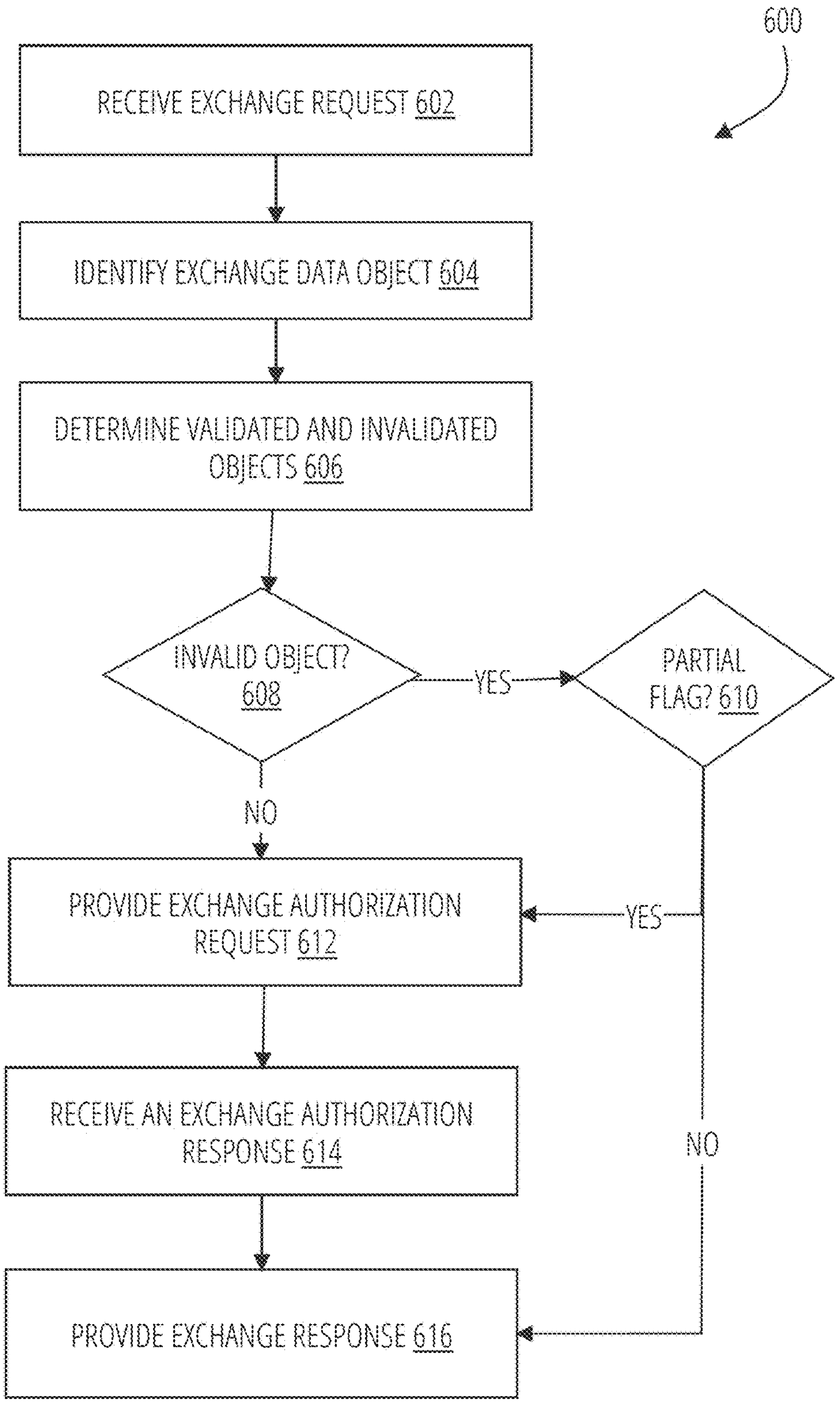
Figure 7:
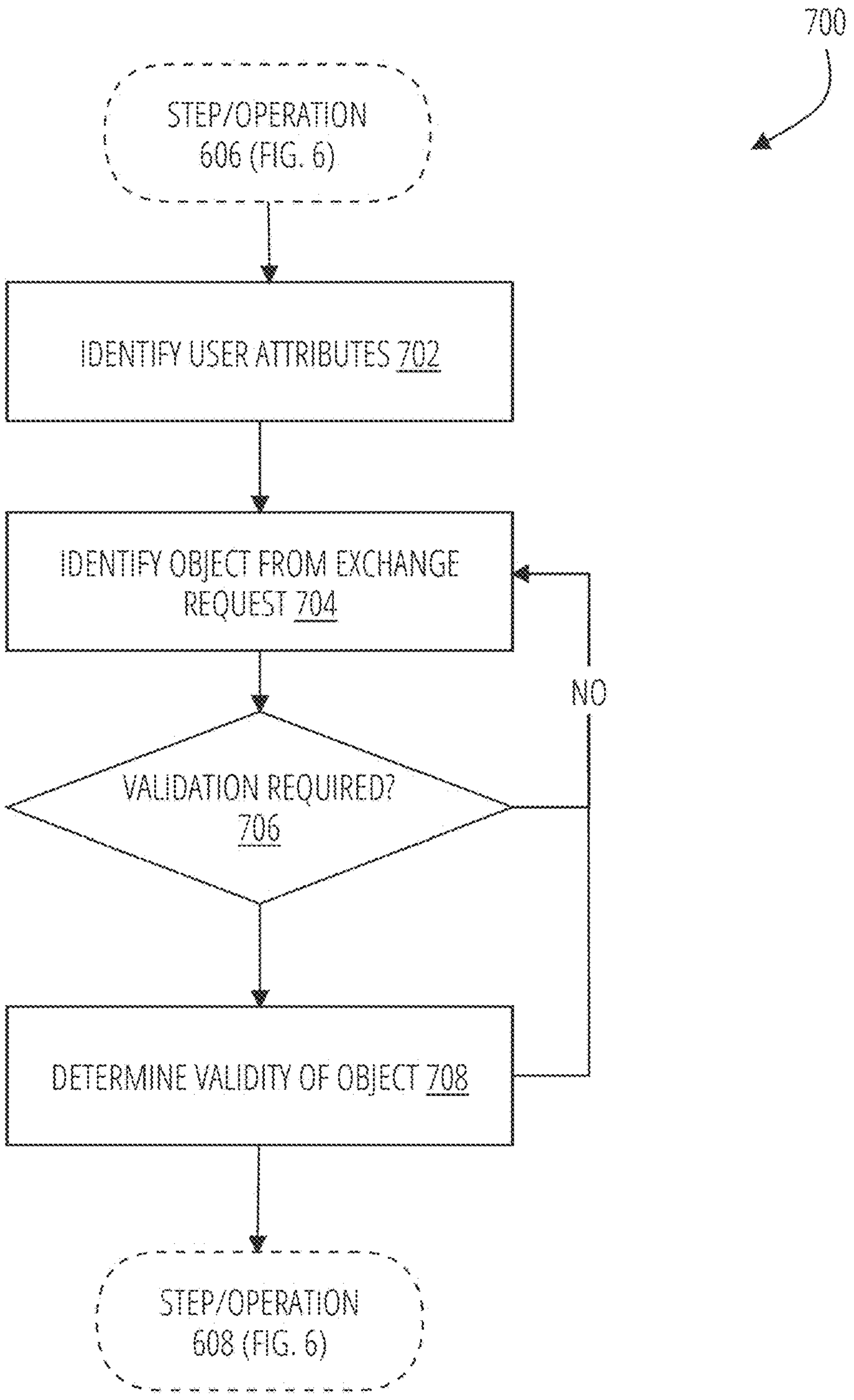
Figure 8:
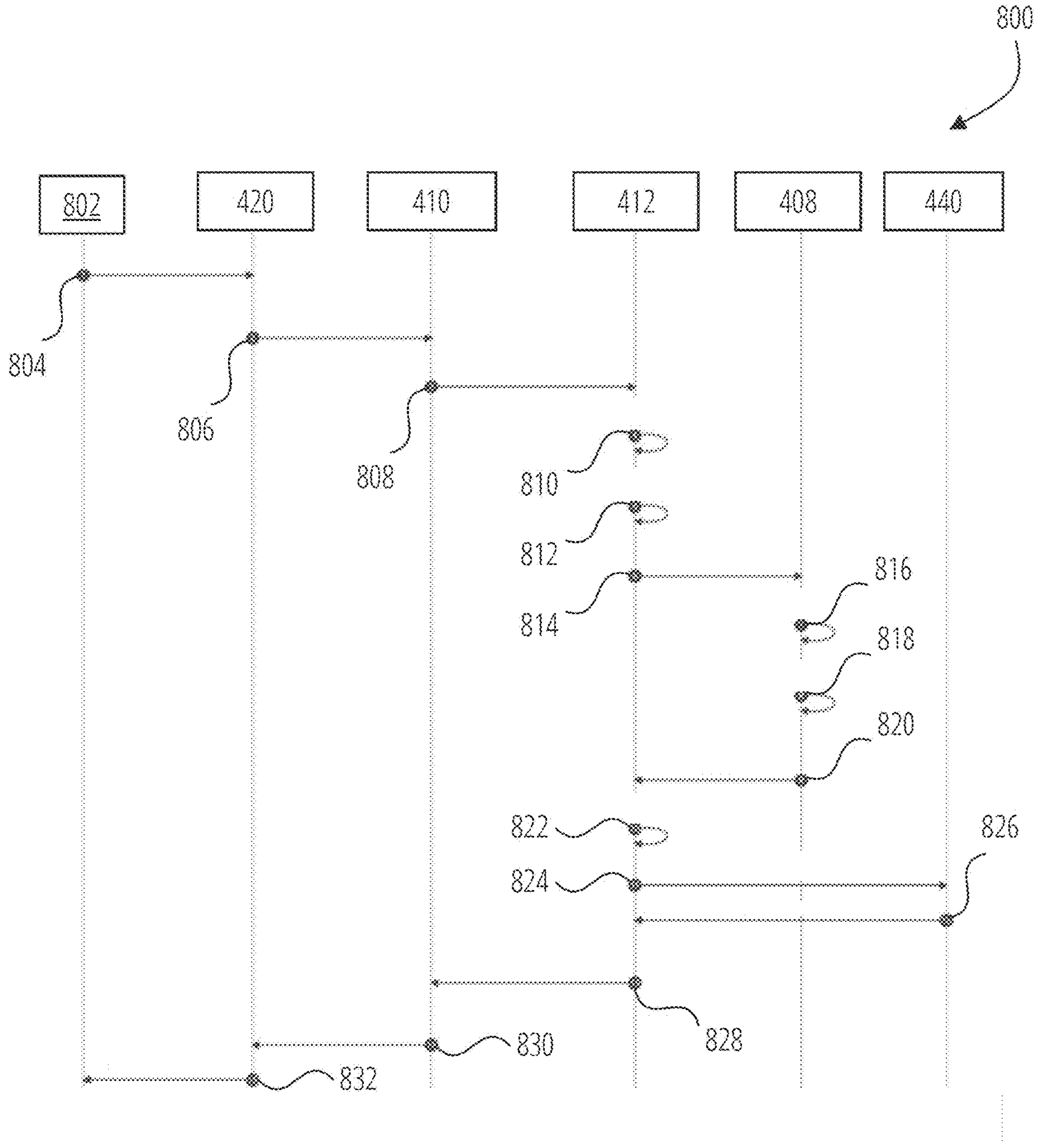

FIG. 6 provides a process flow for facilitating a credential-less exchange of value in accordance with one or more embodiments of the present disclosure;

FIG. 7 provides a process flow for adjudicating objects of a value-based exchange in accordance with one or more embodiments of the present disclosure; and FIG. 8 provides a messaging flow for validating a value-based exchange in accordance with one or more embodiments of the present disclosure.

DETAILED DESCRIPTION OF SOME EXAMPLE EMBODIMENTS

Various embodiments of the present disclosure are described more fully hereinafter with reference to the accompanying drawings, in which some, but not all embodiments of the present disclosure are shown. Indeed, the present disclosure may be embodied in many different forms and should not be construed as limited to the embodiments set forth herein; rather, these embodiments are provided so that the present disclosure will satisfy applicable legal requirements. The term "or" is used herein in both the alternative and conjunctive sense, unless otherwise indicated. The terms "illustrative" and "example" are used to be examples with no indication of quality level. Terms such as "computing," "determining," "generating," and/or similar words are used herein interchangeably to refer to the creation, modification, or identification of data. Further, "based at least in part on," "based at least on," "based upon," and/or similar words are used herein interchangeably in an open-ended manner such that they do not necessarily indicate being based at least in part only on or based solely on the referenced element or elements unless so indicated. Like numbers refer to like elements throughout.

I. General Overview and Technical Advantages

Various embodiments of the present disclosure provide technical solutions for managing network-based exchanges. In various embodiments, an exchange platform may be configured to facilitate a credential-less exchange of value between one or more member platforms. These exchanges may be facilitated in real time, without persistent credentials that may expose members to financial, legal, reputational, or other risks. Accordingly, in various embodiments, client devices may purchase, sell, and/or execute a value-based exchange, in real-time, over any network, without exposing sensitive information susceptible to network-based attacks.

Embodiments of the present disclosure provide improved object-level exchange validation techniques that leverage new interfaces and data transformation and policy matching techniques to increase data security and communication flexibility, while reducing computing resource expenditure requirements for safeguarding sensitive data through network communications.

Some techniques of the present disclosure, for example, retrieve and transform data objects into unique data keys recognizable only to approved entities. The data keys may be provided and/or established by leveraging exchange interfaces between an exchange platform and other member platforms in an exchange network. Once established, the data keys may be mapped to sensitive credentials stored within a source platform (e.g., a service provider platform), without requiring the network transmission of the sensitive credentials. Future communications to facilitate a value-based exchange may replace traditional, persistent credentials with data keys to enable a source platform to identify persistent credentials and/or perform one or more actions for a particular instrument associated therewith. In this manner, the exchange platform may facilitate an exchange using keys (and/or other identifiers) that are not, by themselves, traceable to underlying sensitive information. This, in turn, allows the exchange platform to holistically track, facilitate, and distribute network-based communications without exposing a member to network attacks.

Some embodiments of the present disclosure present network-based exchange processing techniques for facilitating credential-less exchanges. To do so, some of the techniques of the present disclosure leverage new data structures, UUEKs, that may replace persistent credentials traditionally used to authorize a value-based exchange. Using the techniques of the present disclosure, a UUEK may be securely issued across member platforms to allow a user to execute a value-based exchange using an identifier that is recognizable to a single party, the exchange platform. The UUEK may be mapped to unique identifiers that may reference sensitive information without directly identifying (and thereby exposing) the sensitive information. A unique identifier, for example, may reference a mapping only interpretable by a source platform, such that the identifiers are unusable by malicious parties unaffiliated with the exchange platform. In this manner, the exchange platform may distribute, track, and facilitate exchanges without exposing member platforms to data security risks. Moreover, the exchange platform may continuously update, modify, and/or redistribute UUEKs to the member platforms to continuously adapt UUEKs in real time. In this manner, the exchange platform may provide technical improvements to data and network security, while reducing the computing resource requirements (e.g., for securely encrypting persistent credentials) for facilitating value-based exchanges.

Some techniques of the present disclosure may leverage credential-less exchanges of the present disclosure to enable the use of flexible exchange interfaces between members of an exchange network. Unlike traditional exchange interfaces, credential-less exchanges allow for the use of interfaces capable of providing contextual information, such as object-level details, associated with a requested value-based exchange. By doing so, an intermediary computing platform may receive information necessary for validating individual objects of a value-based exchange with respect to various exchange criteria, such as user age restrictions. Ultimately, this enables a network administered solution in which a single computing entity, the intermediary computing platform, may enforce user restrictions in real time on behalf of a plurality of members.

The exchange interfaces provide a transport mechanism for both object-level details and user-level details to enable a central validation service for validating individual objects for a particular user involved in a value-based exchange. In some examples, the user-level details may be tied to a UUEK that is used for authorizing the value-based exchange. In some examples, the user-level details may be recorded in a system data object that correspond to the UUEK. In either case, a secure and virtual UUEK may replace the traditional reliance on physical forms of identification for user verification purposes. This, in turn, allow a single, intermediate computing platform, to handle the validation of object with respect to users. By handling exchange validation, the techniques of the present disclosure reduce requirements for secondary computing entities (and users thereof) in the exchange network, thereby allowing new entrants to support unique programs regardless of the sophistication of their representatives or computing solutions thereof.

Example inventive and technologically advantageous embodiments of the present disclosure include (i) data transformation, mapping, and processing schemes for facilitating the network-based credential-less exchanges, (ii) exchange interfaces and network-based communication schemes for improving network security for cross-platform communications, (iii) ephemeral data structures and data management techniques for distributing the ephemeral data structures to facilitate real-time, secure, and dynamic value-based exchanges, and (iv) real-time user validation techniques for validating individual objects with respect to a user involved in an exchange.

II. Example Definitions

In some embodiments, the term "exchange platform" refers to a computing entity that is configured to facilitate credential-less exchanges of value for one or more members in an exchange network. The exchange platform may include one or more processing devices, memory devices, and/or the like that are physically and/or wirelessly coupled and configured to collectively (and/or individually) perform the one or more computing tasks for facilitating a value system agnostic exchange. In some examples, the exchange platform may include, define, and/or otherwise leverage one or more APIs for facilitating communications (e.g., requests and responses, etc.) between a plurality of members. As described herein, the APIs may be leveraged to facilitate a secure exchange between one or more members in any value system.

In some embodiments, the term "member" refers to an entity that collaborates with the exchange platform to take part in an exchange of value. As examples, a member may include (i) a partner that utilizes the exchange platform to receive value, (ii) a service provider that utilizes the exchange platform to provide value, and/or (iii) both a partner and a service provider. As used herein, a member may refer to as a partner when it receives value through a value exchange and/or a service provider when it provides value through a value exchange. Thus, the same member may be a partner or a service provider depending on the role of the member in a value exchange. For example, a member may be a partner that receives value for a value exchange. The same member may be a service provider that provides value in another value exchange. In some examples, the same member may be both the partner and the service provider in the same value exchange, such that the member utilizes the exchange platform to provide and then receive value in a sole member value exchange.

In some embodiments, a member is a partner when it utilizes a service provided by a service provider. A partner may include any value seeking entity in any value system. As an example, in a financial value system, a partner may include a merchant (e.g., retailer, brick-and-mortar establishment, etc.) that may utilize a service provider, such as a financial institution, to access funds for a financial transaction. In addition, or alternatively, in an information value system, a partner may include a news publisher (e.g., a newspaper, media organization, etc.) that may utilize a service provider, such as a news agency (e.g., wire service, news service, etc.) to access information for an information transaction. As will be understood, the techniques of the present disclosure may be applied to any value system and the partner may include any value seeker for any respective value system.

In some embodiments, a member is a service provider when it provides a service for a partner. A service provider may include a source of value in any value system. As an example, in a financial value system, a service provider may include a financial institution (e.g., bank, currency exchange platform, credit union, etc.) that may provide access to funds for a financial transaction between one or more entities. In addition, or alternatively, in an information value system, a service provider may include a news agency (e.g., wire service, news service, etc.) that may source information for publication by a news publisher. As will be understood, the techniques of the present disclosure may be applied to any value system and the service provider may include any source of value for any respective value system.

In some embodiments, the term "service provider instrument" refers to a mechanism leveraged by a service provider for providing value on behalf of a particular user. The service provider instrument may depend on the value system and/or service provider. In some examples, the service provider instrument may include an account with the service provider. For example, in a financial value system, a service provider instrument may include a bank account (e.g., checking, saving, etc.), brokerage account, line of credit, and/or the like. In an information value system, the service provider instrument may include a subscriber account, and/or the like. In some examples, a service provider instrument may include a virtual instrument hosted by a service provider platform.

In some embodiments, a service provided by a service provider is subject to one or more policies. For instance, a service provider may be associated with one or more member policies for validating the use of a service provider instrument maintained by the service provider.

For example, a service provider and/or a service provider instrument thereof may be associated with an entity that governs the use of one or more services provided by the service provider. By way of example, the service provider may facilitate an electronic benefit transfer (EBT) system, such as supplemental nutrition assistance program ("SNAP"), temporary assistance for needy families ("TANF"), special supplemental nutrition program for women, infants, and children ("WIC"), and/or the like, that provides financial aid for authorized food and household items. As another example, the service provider may facilitate a healthcare plan on behalf of a health care provider that restricts benefits according to healthcare eligibility, procedure codes, procedure location, and/or the like.

In addition, or alternatively, a service provider may govern the use of its own services. For instance, the service provider may maintain a service provider instrument for a user of the service provider. The service provider may restrict the service provider instrument on behalf of the user, on behalf of one or more internal policies, and/or the like. By way of example, the service provider may include a financial institution that allows one or more users to restrict access to funds provided by the financial institution. In this manner, a user may provide limited access to a service provider instrument by establishing one or more member policies for a service provider instrument.

In some embodiments, the term "member policy" refers to a data entity that defines one or more criteria for validating objects of a value-based exchange. A member policy may correspond to a member and/or a service provider instrument of a member. For instance, a member policy may define one or more criteria for validating objects based at least in part on one or more member-specific standards. In addition, or alternatively, a member policy may define one or more criteria for validating objects based at least in part on one or more instrument-specific standards. The member-specific standards may apply to a plurality of service provider instruments associated with a member, whereas the instrument-specific standards may apply to at least one of the plurality of service provider instruments associated with a member.

A member policy may be indicative of a plurality of authorized and/or unauthorized policy attributes for a value-based exchange. The authorized policy attributes may be indicative of one or more objects, object attributes, and/or value-exchange attributes that are authorized for a value-based exchange using a service provider instrument in accordance with the member policy. An unauthorized policy attribute may be indicative of one or more objects, object attributes, and/or value-exchange attributes that are restricted from a value-based exchange using a service provider instrument in accordance with the member policy. In some examples, the member policy may define a plurality of authorized policy attributes and the plurality of unauthorized policy attributes may include a plurality of undefined attributes. In some examples, the member policy may define a plurality of unauthorized policy attributes and the plurality of authorized policy attributes may include the plurality of undefined attributes.

In some examples, a policy attribute may include an object identifier, one or more object attributes, and/or one or more value-exchange attributes that identify an object and/or one or more authorized/unauthorized amounts of an object.

For instance, a member policy may include a plurality of object identifiers. The plurality of object identifiers may be indicative of a plurality of objects that are authorized/unauthorized for obtaining (e.g., purchasing, etc.) with a service provider instrument. In some examples, an object identifier may be a global object identifier. For instance, a global object identifier may be a stock keeping unit (SKU) code. In addition, or alternatively, a global object identifier may be a manufacturer part number (MPN), global trade item number (GTIN), product or service name, international standard book number (ISBN), universal product code (UPC), international article number (EIN), a European Article Number (EAN), and/or the like. In some examples, an object identifier may include a system object identifier. A system object identifier, for example, may include an identifier (e.g., a table identifier, etc.) that corresponds to a recorded data object that represents an object within an exchange platform. In some embodiments, a system object identifier and a global object identifier are the same.

As another example, a policy attribute may be indicative of one or more object attributes that are indicative of an authorized/unauthorized object. The one or more object attributes may be indicative of one or more objects (e.g., with one or more different object identifiers, etc.) that are authorized and/or unauthorized for obtaining with a service provider instrument. By way of example, the object attributes may be indicative of an object category (e.g., restricted substances, etc.) that is unauthorized for obtaining with a service provider instrument and/or an object category (e.g., food items, etc.) that is authorized for obtaining with a service provider instrument.

As yet another example, a policy attribute may include value-exchange attributes corresponding to a particular value-based exchange and/or an object included in the value-based exchange. A value-exchange attribute, for example, may include a threshold exchange value for a value-based exchange with a service provider instrument. In addition, or alternatively, a value-exchange attribute may include a threshold object exchange value, a threshold object exchange quantity, and/or the like, for an object included in the value-based exchange. The threshold object exchange value may be indicative of an authorized value for obtaining a particular object with a service provider instrument. The threshold object exchange quantity may be indicative of an authorized quantity (e.g., weight, number of units, etc.) of a particular object that may be obtained (e.g., purchased, etc.) with a service provider instrument.

In some embodiments, the term "recorded data object" refers to a data object that represents an object that may be involved in a value-based exchange. In some examples, a recorded data object may be an internal representation of an object for an exchange platform. For example, an object may include a distinct unit of a value-based exchange for which value is being transferred. A recorded data object for the object may include a data object that records one or more aspects (e.g., object identifiers, object attributes, etc.) of the object.

For instance, a recorded data object may include an object identifier and/or one or more object attributes for a particular object associated with a value system. The object may be based at least in part on the value system. For instance, in a financial value system, an object may be a tangible or intangible item, product, and/or the like that may be purchased in exchange for a unit of currency. In a healthcare value system, an object may be a healthcare procedure, and/or the like that may be covered by a healthcare policy.

In some examples, an exchange platform may maintain and/or have access to an object datastore that includes a plurality of recorded data objects. As described herein, the object datastore may include a plurality of recorded data objects that are at least partially sourced from one or more members of the exchange network and/or one or more third parties.

In some embodiments, the object datastore is generated, updated, and/or maintained using data from one or more external data sources. For example, the one or more external data sources may include one or more object catalogs. Each object catalog may include a plurality of object identifiers and/or object attributes for each object identifier. By way of example, an object catalog may include a ten, twenty, forty, or more data points for each of a plurality of object identifiers. Each data point may be indicative of an object attribute for an object. The object attributes may be sourced, by the external data sources, from a manufacturer, supplier, and/or any other entity associated with a particular object. In some examples, the object datastore may be aggregated from each of one or more different external data sources to aggregate, verify, and/or augment a plurality of recorded data objects 424 associated with a plurality of different entities.

In some embodiments, the term "object attribute" refers to a data entity that describes a characteristic of an object. An object attribute may include an object-based attribute and/or an exchange-based attribute.

For instance, an object-based attribute may include a spatial attribute, a count attribute, a value attribute, a source attribute, a composition attribute, a categorical attribute, and/or any other attribute that is descriptive of an object characteristic. A spatial attribute, for example, may be indicative of one or more dimensions (e.g., height, width, weight, etc.) of an object, value attribute may be indicative of a value (e.g., price, etc.) of the object, a composition attribute may be indicative of one or more ingredients, components, etc. of the object, a categorical attribute may be indicative of one or more categories (e.g., restricted substances, etc.) of the object, and/or the like. By way of example, one or more categorical attribute may be indicative whether an object is associated with (i) one or more general store categories, such as vegetables, fruits, dairy, meat, grains, seeds, alcohol, tobacco, in-store consumable, hot food, pharmacy, pet feed, and non-food, (ii) one or more medical categories, such as a dental, eyecare, general health, etc., (iii) one or more informational categories, such as international sources, domestic sources, etc. and/or the like. In some examples, a composition attribute may be indicative of one or more components of an object, such as a percentage by volume of alcohol within an object, one or more ingredients, such as meat, dairy-derived, peanut-derived, tree nut-derived, soy-derived, and/or the like.

In some examples, an object-based attribute may be based at least in part on the value system. For instance, in at least a financial-based value system, an object-based attribute may include one or more line item attributes, one or more line item adjustments, and/or the like. Line item attributes may include a sequence, a line item group, a product code, an item name, an item source (e.g., provider, manufacturer, etc.,), a description, a quantity, a mass (e.g., gram, kilogram, etc.,), one or more spatial dimensions (e.g., length, width, height, volume, etc.,), a unit amount, a unit tax amount, a line amount (e.g., amount of the line item), a line tax amount, and/or the like. Line item adjustments may include an adjustment type (e.g., manufactures discount, a store discount, a return, a payment cash, a payment gift card, payment other, and/or the like), an item, product, or service code, an item description, an item quantity, a unit-item, an item mass (e.g., gram, kilogram, etc.), a unit amount, a unit tax amount, a line amount (e.g., amount of the line item), a line tax amount, and/or the like.

In some examples, the one or more exchange-based attributes may be indicative of one or more aggregated exchange features. For instance, an exchange-based attribute may include a count attribute that is descriptive of a number of value-based exchanges that involve a particular object. The count attribute, for example, may be indicative of a number of units of a particular object that are obtained through a plurality of value-based exchanges. For example, as described herein, the exchange platform may increment a count attribute for an object each time an object is referenced in a value-based exchange. In some examples, the exchange platform may increment a count attribute for an object each time the object is authorized for obtaining. In some examples, a recorded data object may include a plurality of count attributes that respectively identify a number of units of an object that are obtained (e.g., an obtained count), authorized for obtaining (e.g., an authorized count), and/or requested for obtaining (e.g., a requested count).

In some examples, the one or more exchange-based attributes may include exchange-specific features. For instance, an exchange-based feature may include a source attribute that is descriptive of a location (e.g., retailer, brick and mortar store, healthcare center, informational source, etc.) from which an object is obtained (e.g., purchased, etc.) through a value-based exchange. The location, for example, may include a virtual and/or physical location. In some examples, the location may depend on the value system. For instance, in a financial value system, the source attribute may identify a retailer, a particular brick and mortar store of a retailer, an online platform, and/or the like. In a healthcare value system, the source attribute may be a virtual and/or physical medical center, and/or the like. In an information value system, the source attribute may be an informational source, and/or the like.

In some examples, a recorded data object and/or a count attribute may be source specific. For instance, a different recorded data object and/or count attribute may be maintained for each source from which an object may be obtained. In addition, or alternatively, a recorded data object and/or a count attribute may be source agnostic.

In some embodiments, the term "restricted object" refers to one or more different types of objects that may be associated with exchange criteria for obtaining through a value-based exchange. A restricted object, for example, may include an object that is subject to one or more obtainment restrictions.

In some embodiments, the term "obtainment restriction" refers to a data entity that defines one or more criteria for validating objects of a value-based exchange. An obtainment restriction may define one or more user-specific, location-specific, and/or other rules for validating a restricted object.

The location-specific rules may include one or more geographic restrictions and/or sovereign entity restrictions. For example, the location-specific rules may be indicative of one or more country, state, county, and/or the like, restrictions on the obtainment of one or more restricted objects in a sovereign entity and/or other geographic region. By way of example, one or more restricted objects may be banned for obtainment by federal laws that may form the basis of an obtainment restriction.

The user-specific rules may include one or more age restrictions, residency restrictions, credit score restrictions, and/or the like. In some examples, an age restriction may be indicative of one or more age ranges and/or age thresholds for obtaining a restricted object. For instance, an age restriction may define one or more age categories for one or more restricted objects of different types. Each age category may define an age range (e.g., an age band, etc.) that corresponds to a different type of restricted object. By way of example, a first age category may be indicative of an age range below a minimum age for obtaining a first object, such as tobacco, a second age category may be indicative of an age range above the minimum age range for obtaining tobacco but lower than a second minimum age for obtaining a second object, such as alcohol, and a third category may be indicative of an age range above the second minimum age range.

In some embodiments, an obtainment restriction may be based at least in part on an exchange location associated with a value-based exchange. For instance, location-specific rules and/or user-specific rules may be modified for different locations. The user-specific rules, for example the one or more age categories and/or the like, may be formed on the basis of one or more legal requirements corresponding to an exchange location.

An obtainment restriction may correspond to an object and/or one or more object attributes. For example, one or more obtainment restrictions may correspond to one or more object identifiers. For instance, a recorded data object for an object may include an indication of the one or more obtainment restrictions. In addition, or alternatively, an obtainment restriction may correspond to one or more object attributes. By way of example, an obtainment restriction may correspond to a categorical attribute (e.g., alcohol, tobacco, etc.), a composition attribute (e.g., a percentage of alcohol, etc.), and/or the like.

In some embodiments, the term "validated object" refers to an object of a value-based exchange that is authorized in accordance with one or more obtainment restrictions (if applicable). A validated object, for example, may correspond to an object identifier and/or one or more object attributes that do not correspond to a restricted object and/or correspond to a restricted object in a value-based exchange that achieves the obtainment restrictions corresponding to the restricted object. As an example, in a financial value system, a validated object may be a product or service that is eligible for purchase by a user of a service provider instrument at an exchange location. By way of example, a product may be a gallon of milk that may be associated with a SKU code and/or one or more objects attributes, such as "category: dairy," "quantity: 1 gallon," and/or the like. The product may be a validated object for a value-based exchange in the event that no obtainment restrictions apply to the SKU code and/or the one or more object attributes "category: dairy," "quantity: 1 gallon," and/or the like.

In some embodiments, the term "invalidated object" refers to an object of a value-based exchange that is unauthorized in accordance with one or more obtainment restrictions (if applicable). An invalidated object, for example, may correspond to an object identifier and/or one or more object attributes that correspond to a restricted object in a value-based exchange that does not achieve the obtainment restrictions corresponding to the restricted object. As an example, in a financial value system, an invalidated object may be a product or service that is ineligible for purchase by a user of a service provider instrument at an exchange location. By way of example, a product may be a liter of alcohol that may be associated with a SKU code and/or one or more objects attributes, such as "category: restricted substance," "quantity: liter," and/or the like. The product may be an invalidated object for a value-based exchange in the event that an obtainment restriction applies the SKU code and/or the one or more object attributes "category: restricted substance," "quantity: 1 liter" and one or more user attributes and/or an exchange location do not satisfy the obtainment restrictions.

In some embodiments, the term "exchange request" refers to a data entity that defines a request to perform an exchange of value. An exchange request may be provided to an exchange platform from a member of the exchange network. The exchange request may include one or more request attributes. The one or more request attributes may include one or more object identifiers, object attributes, resolution flags, and/or the like. In some examples, the exchange request may include an exchange location. The exchange location may be indicative of a physical location, such as brick and mortar store, and/or the like, a virtual location, such as an online retail platform, and/or a geographic region, such as a country, state, county, or other region.

The one or more request attributes may include a plurality of object identifiers corresponding to a plurality of objects associated with the value-based exchange. In addition, or alternatively, the one or more request attributes may include one or more object attributes for the plurality of objects. For example, the one or more object attributes may include one or more object-based attributes, such as one or more line item attributes, one or more exchange-based attributes, such as a quantity of the object, a location of the object, and/or the like. For instance, an exchange request may be indicative of the exchange location from which an object is being obtained.

In some examples, the request attributes may be indicative of one or more request resolution flags. A request resolution flag may be indicative of one or more requesting member requirements (e.g., partner requirements, etc.) for the value-based exchange. For instance, one or more request resolution flags may be set by the member of the exchange network that provides the exchange request to the exchange platform. In some examples, a request resolution flag may be indicative of a partial exchange authorization or a full exchange authorization. A partial exchange authorization may authorize the partial completion of a value-based exchange, whereas a full exchange authorization may only authorize a full completion of a value-based exchange. For instance, a full exchange authorization may require the validation of all objects referenced by a value-based exchange.

In some embodiments, the term "validated exchange data object" refers to a data object that is indicative of one or more validated objects of a value-based exchange. In some examples, a validated exchange data object may be based at least in part on a comparison between an exchange request and/or one or more user attributes corresponding to the exchange request. In some examples, a validated exchange data object may include a plurality of object identifiers and/or one or more object attributes for one or more validated objects of a value-based exchange.

In some examples, a validated exchange data object may be indicative of an exchange value. The exchange value may be an aggregated value of each of the validated data objects. In some examples, the exchange value may be modified from an initial exchange value, using some of the techniques of the present disclosure, to tailor the exchange value to the validated objects of the value-based exchange.

In some examples, the validated exchange data object may be indicative of one or more object statuses for the one or more validated objects.

In some embodiments, the term "invalidated exchange data object" refers to a data object that is indicative of one or more invalidated objects of a value-based exchange. In some examples, an invalidated exchange data object may be based at least in part on a comparison between an exchange request and one or more user attributes corresponding to the exchange request. For instance, the invalidated exchange data object may be indicative of a plurality of invalidated objects of the value-based exchange. In addition, or alternatively, an invalidated exchange data object may be based at least in part on an exchange request and a validated exchange data object. For example, the invalidated exchange data object may be indicative of a plurality of invalidated objects of the value-based exchange. For instance, the invalidated exchange data object may be indicative of a plurality of objects of the value-based exchange that are not included in the validated exchange data object.

An invalidated exchange data object may include a plurality of object identifiers and/or one or more object attributes for one or more invalidated objects of a value-based exchange. In some examples, the invalidated exchange data object may be indicative of one or more object statuses for the one or more invalidated objects.

In some embodiments, the term "object status" refers to a data entity that is indicative of a determination and/or classification of an object with respect to a value-based exchange. For example, an object status for a validated object may include an object eligible status, and/or the like. As another example, an object status for an invalidated object may include an object ineligible status, and/or the like. An object status for an object that was not assessed in view of a member policy may include an object unassessed status. An object status for an object that is not addressed by a member policy may include an object unspecified status. In some examples, an object status may be indicative of an obtainment restriction corresponding to an invalidated object. For instance, an object status may include an object age restricted status, and/or the like.

In some embodiments, the term "exchange authorization request" refers to a data entity that defines a request to a member for executing a value-based exchange. In some embodiments, an exchange authorization request is provided from an exchange platform to a member of the exchange network. The exchange authorization request, for example, may be provided to a service provider of the exchange network in response to an exchange request from a partner of the exchange network. In some examples, the exchange authorization request may be indicative of a validated exchange data object for the exchange request. For example, the exchange authorization request may be indicative of the one or more validated data objects, a validated exchange value, one or more object statuses associated with the one or more validated data objects, and/or the like. In some examples, the exchange authorization request may be indicative of an invalidated exchange data object for the exchange request. For example, the exchange authorization request may be indicative of the one or more invalidated data objects, one or more object statuses associated with the one or more invalidated data objects, and/or the like.

In some embodiments, the term "exchange authorization response" refers to a data entity that defines a response to an exchange authorization request. In some embodiments, an exchange authorization response is provided to an exchange platform from a member of the exchange network. An exchange authorization response, for example, may be provided by a service provider of the exchange network in response to an exchange authorization request indicative of one or more validated objects from an exchange request.

In some embodiments, an exchange authorization response is indicative of at least one of an exchange approval or an exchange denial. The exchange authorization response may be based at least in part on a comparison between an exchange value (e.g., modified based at least in part on the validated objects, etc.) and an asset availability of a service provider instrument. For example, responsive to receiving an exchange authorization request, a member may be configured to compare the exchange value to an asset availability of an identified service provider instrument. A value-based exchange may be authorized (e.g., resulting in an exchange approval, etc.) in the event that the asset availability exceeds the exchange value, otherwise the value-based exchange may be denied (e.g., resulting in an exchange denial).

In some embodiments, the exchange authorization response is indicative of one or more contextual response attributes. The one or more contextual response attributes, for example, may be indicative of one or more contributing factors to an exchange authorization response. Contributing factors, for example, may include bad actor risk and/or fraud check, error, full approval, instrument closed, instrument-based risk and/or fraud check, insufficient value, invalid UUEK, limit exceeded (e.g., UUEK or instrument usage limit exceeded), missing line items (e.g., for exchanges of value that do not include validated objects), instrument not found, account not found, pin required, partial approval, member not available, transaction risk and/or fraud check, unsupported operation, user contact member (e.g., a user may need to contact a member, such as a service provider, to resolve an issue), user risk and/or fraud check, and combinations thereof.

In some embodiments, the term "exchange response" refers to a data entity that defines a response to an exchange request. In some embodiments, an exchange response is provided from an exchange platform to the member that provided the exchange request. The exchange response may be indicative of the exchange approval and/or the exchange denial. In addition, or alternatively, the exchange response may be indicative of the validated data object, invalidated data object, and/or contextual response attributes. By way of example, the exchange response may be indicative of the one or more validated objects and/or the one or more invalidated objects for the exchange request.

In some embodiments, the term "exchange record" refers to a data entity that provides contextual information for an exchange request. The contextual information may be indicative of one or more aspects of an exchange request, an exchange response, an exchange authorization request, and/or an exchange authorization request. For example, an exchange record may be indicative of the one or more validated objects, invalidated objects, object statuses for each validated and/or invalidated object, and/or any other information associated with the value-based exchange.

In some embodiments, the term "member platform" refers to a computing entity corresponding to a member. The member platform may include a partner computing platform acting on behalf of a partner, a service provider computing platform acting on behalf of a service provider, and/or both. In some examples, a member platform may be both a partner platform and the service provider platform. For example, the same member platform may be configured to operate on behalf of a partner for one value exchange and a service provider for another value exchange. In some examples, the same member platform may be configured to operate on behalf of both a partner and service provider in a single value exchange. It is noted that the term member platform may refer to a partner platform, a service provider platform, or both and, in some examples, may depend on the role of the member platform in a value exchange (e.g., and/or one or more APIs utilized by the member platform in the value exchange).

In some embodiments, a partner platform is a computing entity that is configured to perform one or more operations on behalf of a partner. A partner platform, for example, may include one or more processing devices, memory devices, and/or the like that are physically and/or wirelessly coupled and configured to collectively (and/or individually) perform the one or more computing tasks for requesting value in a value system agnostic exchange. In some examples, a partner platform may include, define, and/or otherwise leverage one or more APIs for facilitating communications (e.g., requests and responses, etc.) with the exchange platform. In some examples, a partner platform may be configured to host one or more user-facing applications (e.g., a partner application, etc.) for interacting with one or more users.

In some embodiments, a service provider platform is a computing entity that is configured to perform one or more operations on behalf of a service provider. A service provider platform, for example, may include one or more processing devices, memory devices, and/or the like that are physically and/or wirelessly coupled and configured to collectively (and/or individually) perform the one or more computing tasks for providing value in a value system agnostic exchange. In some examples, a service provider platform may include, define, and/or otherwise leverage one or more APIs for facilitating communications (e.g., requests and responses, etc.) with the exchange platform. In some examples, a service provider platform may be configured to facilitate one or more service provider instruments. In some examples, the service provider platform may be configured to host one or more user-facing applications (e.g., a service provider application, etc.) for managing the one or more service provider instruments.

In some embodiments, the term "exchange interfaces" refers to a set of instructions for facilitating communications between the exchange platform and one or more member platforms and/or internal services. An exchange interface may include an API, file based interface, a message queue based interface, and/or the like. For instance, an exchange interface may include an API including, as examples, one or more simple object access protocol (SOAP) APIs, one or more remote procedure call (RPC) APIs, one or more websocket APIs, one or more representational state transfer (REST) APIs, and/or the like. In some embodiments, an exchange interface may include one or more RPC APIs, such as one or more gRPC APIs.

The exchange platform may include, define, and/or otherwise leverage one or more different exchange interfaces for facilitating communication with one or more external platforms, such as one or more member platforms (e.g., a partner platform, service provider platform, etc.). Each API may include a plurality of communication instructions, message definitions, and/or the like for exchanging requests and/or responses between the exchange platform and an entity that is taking part in a value exchange. By way of example, an exchange interface may include a partner API for facilitating communication with a partner platform and/or a service provider API for facilitating communication with a service provider platform.

In some embodiments, the term "partner interface" refers to an exchange interface for facilitating one or more communications between a partner platform and the exchange platform. The partner interface may define one or more communication instructions, message definitions, and/or the like for facilitating one or more request messages and/or response messages between a partner platform and the exchange platform. The partner interface, for example, may include an API that defines (i) requests to the exchange platform from a computing entity acting as a partner platform and/or (ii) requests from the exchange platform to the partner platform. For example, the partner interface may define one or more registration messages, session messages, transaction messages, and/or the like for facilitating an exchange of value for the partner. In some embodiments, the partner interface defines one or more identifiers for securely identifying one or more portions of a value exchange.

In some embodiments, the term "service provider interface" refers to an exchange interface for facilitating one or more communications between a service provider platform and the exchange platform. The service provider interface may define one or more communication instructions, message definitions, and/or the like for facilitating one or more request messages and/or response messages between a service provider platform and the exchange platform. The service provider interface, for example, may include an API that defines (i) requests to the exchange platform from a computing entity acting as a service provider platform and/or (ii) requests from the exchange platform to the service provider platform. The service provider interface, for example, may define one or more registration messages, session messages, transaction messages, and/or the like for facilitating an exchange of value using a service provider instrument. In some embodiments, the service provider interface defines one or more identifiers for securely identifying one or more portions of a value exchange.

In some embodiments, the term "entity partition" refers to a unique identifier for a computing entity. An entity partition may include a unique number, alpha-numeric, and/or the like that represents a particular computing entity. An entity partition, for example, may include a member partition that represents a member platform, a service provider partition that represents a service provider platform, a partner partition that represents a partner platform, and/or the like.

In some embodiments, the term "service provider partition" refers to a unique identifier for a service provider and/or service provider platform of a service provider. The service provider partition may include a sequence of numeric, alpha-numeric, any/or any other characters or symbols that are representative of a service provider that is associated (e.g., onboarded, registered, etc.) with the exchange platform. The exchange platform, for example, may include a plurality of service provider partitions that respectively identify a service provider platform that is affiliated with (e.g., onboarded with, registered with, etc.) the exchange platform. Each service provider partition may represent a service provider platform that has configured one or more exchange platform software development kits (SDKs), and/or like for implementing a service provider interface of the exchange platform.

In some embodiments, a "partner partition" refers to a unique identifier for a partner and/or a partner platform of a partner. The partner partition may include a sequence of numeric, alpha-numeric, any/or any other characters or symbols that are representative of a partner that is associated with the exchange platform. The exchange platform, for example, may include a plurality of partner partitions that respectively identify a partner platform that is affiliated with (e.g., onboarded with, registered with, etc.) the exchange platform. Each partner partition may represent a partner platform that has configured one or more exchange SDKs, and/or the like for implementing a partner interface of the exchange platform.

In some embodiments, the term "user-facing application" refers to a computer program hosted by a computing entity for facilitating one or more user interactions. A user-facing application may include software (e.g., computer readable instructions, etc.) designed to perform one or more computing tasks for a computing entity, such as a member platform. For instance, a user-facing application may facilitate communication between a member and a user. As examples, the user-facing application may be configured to present one or more user interfaces for interacting with a user on behalf of a member. In some examples, the user-facing application may be configured to receive user input (e.g., via one or more user interfaces) to receive information from a user.

In some embodiments, a user-facing application is a partner application that is hosted by the partner platform (e.g., a member platform acting as a partner for a particular exchange, etc.) to facilitate functions for a partner. A partner application may include software (e.g., computer readable instructions, etc.) designed to perform one or more computing tasks for a partner. For instance, a partner application may be configured to present one or more user interfaces for interacting (e.g., browsing, purchasing, reviewing, etc.) with one or more products offered by a retail-based partner, one or more units of information offered by an information-based partner, and/or the like. In some examples, the partner application may be configured to receive user input (e.g., via one or more user interfaces) to receive information from a user.

In some embodiments, a user-facing application is a service provider application that is hosted by the service provider platform (e.g., a member platform acting as a service provider for a particular exchange, etc.) to facilitate functions for the service provider. A service provider application may include software (e.g., computer readable instructions, etc.) designed to perform one or more computing tasks for a service provider. For instance, a service provider application may be configured to present one or more user interfaces for interacting (e.g., reviewing, managing, auditing, enrolling, etc.) with one or more service provider instruments facilitated by the service provider. By way of example, in a financial value system, the service provider application may enable access to a bank account, brokerage account, line of credit, and/or the like, to manage funds, assets, and/or the like, handled by the respective accounts. In some examples, the service provider application may be configured to receive user input (e.g., via the one or more user interfaces) to receive information, authorizations, and/or the like from a user.

In some embodiments, the term "instrument data object" refers to a data entity that represents a service provider instrument. The instrument data object may include one or more instrument identifiers and/or one or more instrument attributes. In some examples, the one or more instrument identifiers and/or one or more instrument attributes may be based at least in part on a type of instrument data object. By way of example, a service provider instrument may be represented in a member platform as a member instrument data object. In addition, or alternatively, the service provider instrument may be independently represented by a system instrument data object in an exchange platform. In some examples, the member instrument data object and the system instrument data object may include one or more of the same one or more instrument identifiers and/or one or more instrument attributes. By way of example, a member platform may register a plurality of service provider instruments with an exchange platform. During registration, the member platform may provide one or more of the instrument identifiers and/or instrument attributes and, in some examples, the exchange platform may return another identifier.

In some embodiments, the member instrument data object is an internal representation of a service provider instrument within a member platform. The member instrument data object may include one or more instrument identifiers, such as a member instrument identifier, an instrument key from the exchange platform, and/or a user identifier. The user identifier, for example, may include a member user identifier. In addition, or alternatively, the member instrument data object may include one or more instrument attributes, such as an instrument type (e.g., credit-based instrument, debit-based instrument, information-based instrument, etc.), an instrument representation, and/or one or more contextual attributes. In some examples, the contextual attributes may depend on the value system. For instance, in a financial value system, the one or more contextual attributes may be indicative of a (i) currency associated with the service provider instrument, (ii) an asset availability (e.g., a balance, coverage, etc.) of the service provider instrument, (iii) one or more previous transactions with the service provider instrument, and/or the like.

In some embodiments, the system instrument data object is an external representation of a service provider instrument within the exchange platform. The system instrument data object may include one or more instrument identifiers, such as an instrument reference for a member platform, a system instrument identifier, and/or a user identifier. The user identifier, for example, may include a system user identifier. In addition, or alternatively, the system instrument data object may include one or more instrument attributes, such as an instrument type (e.g., credit-based instrument, debit-based instrument, information-based instrument, etc.), an instrument representation, and/or one or more contextual attributes. In some examples, the contextual attributes may depend on the value system. For instance, in a financial value system, the one or more contextual attributes may be indicative of a currency associated with the service provider instrument.

In some embodiments, the term "instrument identifier" refers to any representation of a service provider instrument. The instrument identifier may include an instrument identifier, instrument reference, instrument key, and/or the like, as described herein.

In some embodiments, the term "member instrument identifier" refers to a unique identifier for representing a service provider instrument within a member platform. The member instrument identifier, for example, may include a sequence of numeric, alpha-numeric, any/or any other characters or symbols that represent a service provider instrument to a service provider platform.

In some embodiments, the term "instrument reference" refers to a unique identifier for referencing a member instrument identifier. The instrument reference, for example, may be generated and/or provided by a member platform to an exchange platform to allow the exchange platform to reference an instrument maintained at the member platform. In some examples, the instrument reference is the same value as the member instrument identifier. In some examples, the instrument reference is a different value that is mapped to the member instrument identifier.

In some embodiments, the term "system instrument identifier" refers to a unique identifier for representing a service provider instrument within an exchange platform. The system instrument identifier, for example, may include a sequence of numeric, alpha-numeric, any/or any other characters or symbols that represent a service provider instrument to an exchange platform. In some examples, the system instrument identifier may include a UUID.

In some embodiments, the term "instrument key" refers to a unique identifier for referencing a system instrument identifier. The instrument key, for example, may be generated and/or provided by the exchange platform during a registration process of an instrument with the exchange platform. In some examples, the instrument key may include a wrapped system instrument identifier. For example, the instrument key may include a string of alpha-numeric characters that are formatted according to a key format established by the exchange platform (and/or one or more APIs thereof). The key format may include any number of characters, such as fifty characters or more. In some examples, the characters may be case sensitive. A first portion of the characters (e.g., the first six characters) may be reserved as a partition for identifying an entity associated with the key. For an instrument key, the partition may include a service provider partition. A second portion of the characters may identify the system instrument identifier. The key formats described herein may include one or more different portions, each of which may be arranged in any order.

In some embodiments, the term "instrument representation" refers to a unique identifier for representing a service provider instrument to a user. The instrument representation, for example, may include a sequence of numeric, alpha-numeric, any/or any other characters or symbols that are outwardly representative of a service provider instrument. The format and/or value of an instrument representation may be based at least in part on the type of service provider and/or service provider instrument. For instance, in a financial value system, an instrument reference may include a portion (e.g., the last four digits, etc.) of persistent credentials, such as an account number (e.g., debit account, credit account, etc.), a financial account name, and/or the like. As another example, in an information value system, an instrument reference may include a portion (e.g., one or more digits, alpha-numeric characters, etc.) of persistent credentials, such as a subscription account, and/or the like. For instance, the instrument representation may include a derivative of persistent credentials that may only allow entities with prior knowledge of the persistent credentials to identify the persistent credentials using the instrument representation. As another example, the instrument representation may include an instrument nickname that is assigned and thereafter recognized by a user.

In some embodiments, the term "user data object" refers to a data entity that represents a user that interacts with a member platform and/or the exchange platform. A user, for example, may include an entity (e.g., person, organization, group, etc.) that engages in an exchange of value governed by the exchange platform. In some examples, the user may indirectly cooperate with the exchange platform by creating a user account with a registered service provider, registering (and/or giving permission to register) a service provider instrument, and/or the like. In some examples, the exchange platform may act on the user's behalf without the user directly engaging with the exchange platform. For example, the exchange platform may act as a hidden intermediary between a user-facing application and a user's service provider instrument.

In some embodiments, a user data object includes one or more user identifiers and/or one or more user attributes. In some examples, the one or more user identifiers and/or one or more user attributes may be based at least in part on a type of user data object. By way of example, a user may be represented in a member platform as a member user data object. In addition, or alternatively, the user may be independently represented by a system user data object in an exchange platform. In some examples, the member user data object and the system user data object may include one or more of the same one or more user identifiers and/or user attributes. By way of example, a member platform may register a plurality of users with an exchange platform. During registration, the member platform may provide one or more of the user identifiers and/or user attributes and, in some examples, the exchange platform may return another identifier.

In some embodiments, the member user data object is an internal representation of a user within a member platform. The member user data object may include one or more user identifiers, such as a member user identifier, a user key from the exchange platform, and/or the like. In addition, or alternatively, the member user data object may include one or more user attributes. The one or more user attributes may be indicative of one or more contextual characteristics for a user. In some examples, the user attributes may be indicative of one or more identifiable characteristics for a user. By way of example, the user attributes may be indicative of a user's first name, last name, email, physical address (e.g., one or more of a street, locality, region, postal code, country, etc.), birthday (e.g., a birth date, an age band, etc.), phone number, and/or the like. In some examples, the user attributes may include encrypted, hashed, and/or otherwise secured representations of the identifiable characteristics for a user. For instance, the user attributes may include one or more hashed identifiers for the user and/or the like.

In some embodiments, the user attributes may be indicative of an age of a user. The user attributes, for example, may be indicative of a user's birthday. In addition, or alternatively, the user attributes may be indicative of an age band. An age band may be indicative of an age category for a user. For instance, an age category may be indicative of an age range that is tailored to one or more obtainment restrictions. As an example, in the United States, an age band may include (i) an underage band indicative of a user as under 18 years of age, (ii) a first partial underage band indicative of a user that is over 18 but under 19 years of age, (iii) a second partial underage band indicative of a user that is over 19 but under 21 years of age, and (iv) an unrestricted band indicative of a user that is over 21 years of age. In this manner, a user attribute may reflect age related information for a user without exposing sensitive user information, such as a user birth date.

In some embodiments, the system user data object is an external representation of a member's user within the exchange platform. The system user data object may include one or more user identifiers, such as a user reference for a member platform, a system user identifier, and/or the like. In addition, or alternatively, the system user data object may include one or more user attributes, such as those described herein. By way of example, a member platform may register a user with the exchange platform. During registration, the member platform may provide the user reference for the user and/or the one or more user attributes. In some examples, the user attributes may include hashed and/or encrypted identifiers for the user.

In some embodiments, the term "user identifier" refers to a unique identifier for a user involved in a value-based exchange. A user identifier may include a sequence of numeric, alpha-numeric, any/or any other characters or symbols that are representative of a user of the exchange platform and/or member platform. In some examples, a user identifier may include a user reference, a user key, a system user identifier, a member user identifier, and/or the like.

In some embodiments, the term "system user identifier" refers to a unique identifier for representing a user within an exchange platform. The system user identifier, for example, may include a sequence of numeric, alpha-numeric, any/or any other characters or symbols that represent a user to an exchange platform. In some examples, the system user identifier may include a UUID specific to a particular user.

In some embodiments, the term "member user identifier" refers to a unique identifier for representing a user within a member platform. The member user identifier, for example, may include a sequence of numeric, alpha-numeric, any/or any other characters or symbols that represent a user to a service provider platform.

In some embodiments, the term "user reference" refers to a unique identifier for referencing a member user identifier. The user reference, for example, may be generated and/or provided by a member platform to an exchange platform to allow the exchange platform to reference a user associated with the member platform. In some examples, the user reference is the same value as the member user identifier. In some examples, the user reference is a different value that is mapped to the member user identifier.

In some embodiments, the term "user key" refers to a unique identifier for referencing a system user identifier. The user key, for example, may be generated and/or provided by the exchange platform during a registration process of a user with the exchange platform. In some examples, the user key may include a wrapped system user identifier. For example, the user key may include a string of alpha-numeric characters that are formatted according to a key format established by the exchange platform (and/or one or more APIs thereof). The key format, for example, may include a first portion of the characters (e.g., the first six characters) that may be reserved as a partition for identifying an entity (e.g., a member, etc.) associated with the key. For example, for a user key, the partition may include a service provider partition and/or a partner partition. A second portion of the characters may identify the system user identifier.

In some embodiments, the term "exchange data object" refers to a data entity that represents an authorized value exchange between one or more members associated with the exchange platform. In some examples, the exchange data object may include one or more identifiers and/or one or more exchange attributes. For example, the one or more identifiers and/or one or more exchange attributes may be based at least in part on a type of exchange data object. By way of example, an exchange may be represented in a member platform as a member exchange data object. In addition, or alternatively, the exchange may be independently represented by a system exchange data object in an exchange platform. In some examples, the member exchange data object and the system exchange data object may include one or more of the same one or more identifiers and/or exchange attributes. By way of example, using some of the techniques of the present disclosure, the exchange platform may issue one or more unique identifiers to a member platform that may be used to authorize a value exchange.

In some embodiments, the system exchange data object is an internal representation of a value exchange that is intermediated using the exchange platform. In some examples, the system exchange data object may include one or more different identifiers and/or exchange attributes depending on the role of the system exchange data object in a value-based exchange.

For example, a system exchange data object may include a service provider-specific exchange data object that corresponds to a service provider platform. The service provider-specific exchange data object may include one or more identifiers, such as an exchange identifier, a system user identifier, a system instrument identifier, an UUEK, and/or the like. In addition, or alternatively, the service provider-specific exchange data object may include one or more exchange attributes, such as an expiration date, a currency (e.g., for a financial value system, etc.), and/or the like.

In addition, or alternatively, the system exchange data object may include a partner-specific exchange data object that corresponds to a partner platform. The partner-specific exchange data object may include one or more identifiers, such as an exchange identifier, an instrument key, an UUEK, a member instrument reference (e.g., a partner-specific instrument reference, etc.), and/or the like. In addition, or alternatively, the partner-specific exchange data object may include one or more exchange attributes, such as an expiration date, a currency (e.g., for a financial value system, etc.), an instrument type, a previous UUEK identifier, and/or the like. In some embodiments, the member exchange data object is an external representation of a value exchange that is intermediated using the exchange platform. The member exchange data object may include one or more identifiers, such as a member exchange identifier, a member instrument identifier, an UUEK from the exchange platform, and/or the like.

In some embodiments, the term "exchange identifier" refers to a unique identifier for an exchange of value using the exchange platform. The exchange identifier may include a sequence of numeric, alpha-numeric, any/or any other characters or symbols that are representative of at least a user and/or a service provider instrument. In some examples, the unique exchange identifier may include a universally unique identifier (UUID) that may be mapped (e.g., through a series of identifiers, etc.) to a user, a service provider instrument, and/or a member registered with the exchange platform. In some examples, the exchange identifier may be randomly generated using one or more UUID generators. For instance, the exchange identifier may include a randomized sixteen bytes of information generated in accordance with one or more UUID formatting standards, such as UUID v4, and/or the like. Therefore, while the exchange identifier may be leveraged by the exchange platform and/or a member platform for one or more functions, the same exchange identifier will be useless to external parties without a prior association between the exchange identifier and one or more other identifiers. In some examples, the exchange identifier may be externally represented by a UUEK.

In some embodiments, an "universally unique ephemeral key" or "UUEK" refers to an external representation of an exchange identifier that may be issued (e.g., in place of the service provider exchange identifier and/or a partner exchange identifier) to an external entity, such as a user, partner, and/or service provider, to initiate a transaction using the exchange platform. To do so, the UUEK may be generated and issued by the exchange platform to the external entity. Each UUEK may include a plurality of values (e.g., up to fifty characters and/or more that may be case sensitive) that represent one or more aspects of a transaction. For example, the plurality of values may be indicative of an exchange identifier, a partition (e.g., identifying the recipient of the UUEK, etc.), an identifier type, and/or one or more flags. By way of example, an UUEK may include a partner-specific UUEK and/or a service provider-specific UUEK. The partner-specific UUEK may be correlated to a partner-specific exchange data object, whereas a service provider-specific UUEK may be correlated to a service provider-specific exchange data object, as described herein.

By way of example, an UUEK may be generated in accordance with a key format. The key format may include a plurality of characters including, for example, fifty characters or more that may be case sensitive. A first portion of the characters (e.g., the first six characters) may be reserved as a partition for identifying a recipient of the UUEK. The partition, for example, may include a partner partition, a service provider partition, and/or any other member partition. By way of example, an UUEK may be issued in response to a request from an authorized member, such as an affiliated partner and/or service provider.

In addition, or alternatively, at least one character (e.g., a seventh character) of the key format may identify a format of the UUEK. At least another character (e.g., an eighth character) may identify a type of UUEK. In some examples, a second portion of the characters may identify an exchange identifier (e.g., a group of twenty-two characters following the eighth character). A third portion of characters may be reserved (e.g., a group of twenty characters following the first portion of characters). An example representation is provided below:

```
ppppppFiGGGGGGGGGGGGGGGGGGGGGGrrrrrrrrrrrrrrrrrrrr
```

where p represents a partition character, F represents a format character, i represents an identifier type character, G represents an exchange identifier, and r represents a reserved character. The key format allows for 9.8×10 to the 84 unique permutations, which is more than the number of atoms in the known observable universe. This enables the generation and distribution of new UUEKs on-demand without compromising the security of underlying data to which the UUEKs may be mapped, such as identifiers for a user, an instrument, and/or any other potentially sensitive information. The key formats described herein may include one or more different portions, each of which may be arranged in any order.

In some embodiments, the term "session identifier" refers to a unique identifier for identifying a series of related message exchanges between the exchange platform and an external platform.

In some embodiments, the term "matching code" refers to a session-unique identifier for authorizing an enrollment session between one or more entities. The matching code, for example, may include a sequence of numeric, alpha-numeric, and/or the like characters that may be provided to multiple entities to ensure that each of the entities is involved in the same communication sequence. By way of example, a matching code may include a sequence of eight characters that may be generated by the exchange platform, provided to a service provider platform, and then received from a partner platform to ensure that the exchange platform, the service provider platform, and the partner platform are each interacting with the same end user (e.g., by comparing a received matching code to a generated matching code as described herein).

III. Computer Program Products, Methods, and Computing Entities

Embodiments of the present disclosure may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of a data structure, apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises combination of computer program products and hardware performing certain steps or operations.

Embodiments of the present disclosure are described below with reference to block diagrams, flowchart illustrations, messaging flows, and other representations of data, operations, and messaging schemes. It should be understood that each block of the block, arrow, and/or the like of the diagrams, flowchart illustrations, etc. may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some example embodiments, retrieval, loading, and/or execution may be performed in parallel such that multiple instructions are retrieved, loaded, and/or executed together. Thus, such embodiments may produce specifically-configured machines performing the steps or operations specified in the representations of the present disclosure. Accordingly, the representations of the present disclosure support various combinations of embodiments for performing the specified instructions, operations, or steps.

IV. Example System Architecture

Figure 1:
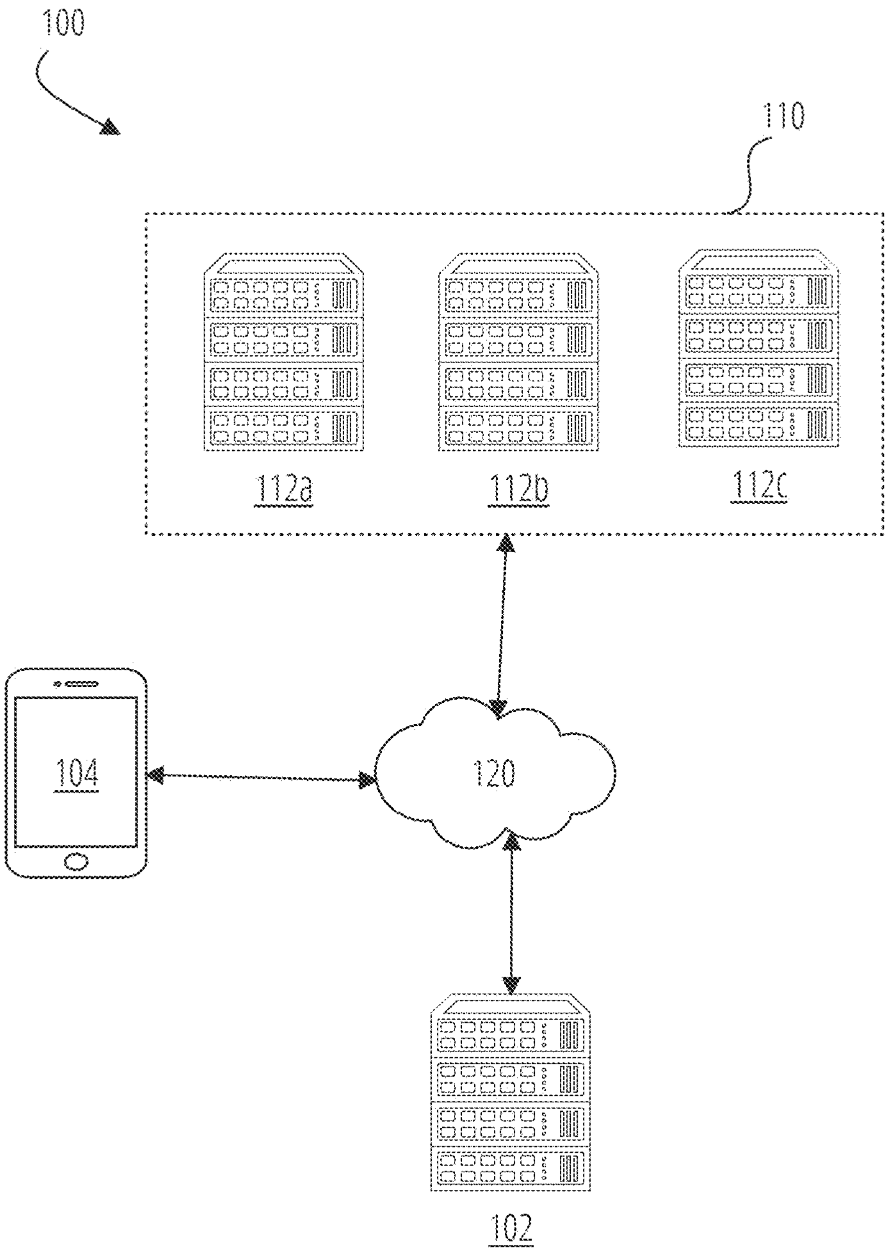
FIG. 1 is an example diagram of a computing ecosystem in accordance with one or more embodiments of the present disclosure.

FIG. 1 provides an illustration of a computing ecosystem 100 that may be used in conjunction with various embodiments of the present disclosure. As shown in FIG. 1, the architecture may include an exchange platform 102, one or more client devices 104, a network of member platforms 110, one or more networks 120, and/or the like. The network of member platforms 110 may include a first member platform 112*a*, a second member platform 112*b*, a third member platform 112*c*, and/or the like that are affiliated (e.g., registered, etc.) with the exchange platform 102. For example, as described herein, the network of member platforms 110 may include a partner platform and/or a service provider platform. In some examples, the partner platform may include a first member platform 112*a* and the service provider platform may include a second member platform 112*b* that is different from the first member platform 112*a*. In some examples, the partner platform and/or the service provider platform may include a single member platform (e.g., third member platform 112*c*). In some examples, the network of member platforms 110 may be configured for one or more different services.

Each of the components of the computing ecosystem 100 may be in electronic communication with, for example, one another over the same or different wireless or wired networks 120 including, for example, a wired or wireless Personal Area Network (PAN), Local Area Network (LAN), Metropolitan Area Network (MAN), Wide Area Network (WAN), or the like. The network 120, for example, may include any network connection including any type of network and/or across any geographic boundary (e.g., inter-country connections involving one or more sovereign entities, etc.). Additionally, while FIG. 1 illustrates certain systems as separate, standalone entities, the various embodiments are not limited to this particular architecture.

Although not explicitly illustrated, the exchange platform 102 may be a client device 104 and/or may be a part of the network of member platforms 110. In addition, or alternatively, the member platforms 112*a-c* may be a client device 104 and/or a part of the exchange platform 102. In some embodiments, each of the exchange platform 102 and/or the member platforms 112*a-c* may include the same computing platform.

a. Example Computing Platform

Figure 2:
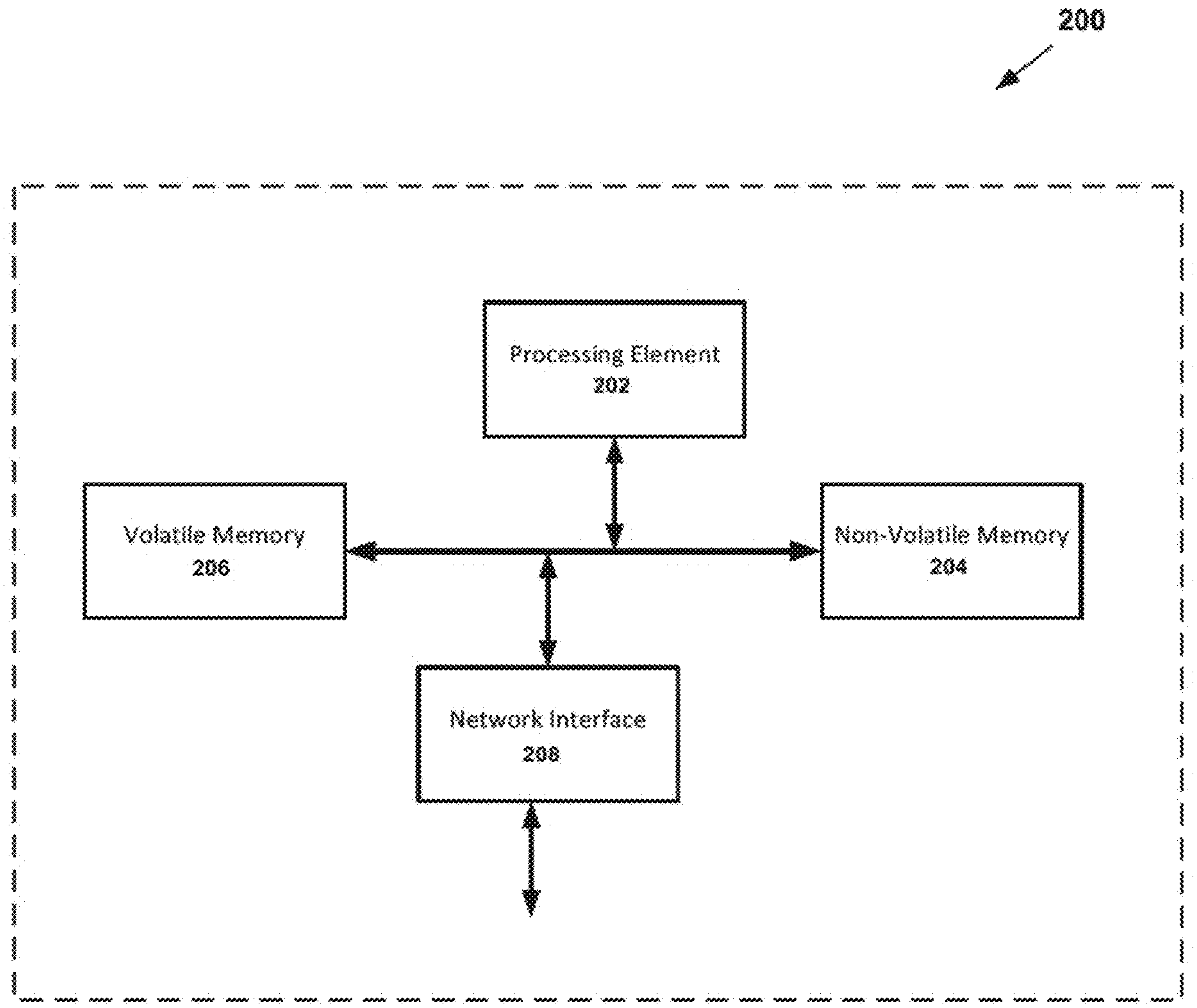
FIG. 2 is an example schematic of a computing platform in accordance with one or more embodiments of the present disclosure.

FIG. 2 is an example schematic of a computing platform 200 in accordance with one or more embodiments of the present disclosure. A computing platform 200, such as the exchange platform 102, the member platforms 112*a-c*, and/or the like of FIG. 1, may include, or be in communication with, one or more processing elements 202 (also referred to as processors, processing circuitry, and/or similar terms used herein interchangeably) that communicate with other elements within the computing platform 200 via a bus, for example. As will be understood, the processing element 202 may be embodied in a number of different ways.

For example, the processing element 202 may be embodied as one or more complex programmable logic devices (CPLDs), microprocessors, multi-core processors, co-processing entities, application-specific instruction-set processors (ASIPs), microcontrollers, and/or controllers. Further, the processing element 202 may be embodied as one or more other processing devices or circuitry. The term circuitry may refer to an entirely hardware embodiment or a combination of hardware and computer program products. Thus, the processing element 202 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 202 may be configured for a particular use or configured to execute instructions stored in volatile or non-volatile media or otherwise accessible to the processing element 202. As such, whether configured by hardware or computer program products, or by a combination thereof, the processing element 202 may be capable of performing steps or operations according to embodiments of the present disclosure when configured accordingly.

In some embodiments, the computing platform 200 includes, or is in communication with, non-volatile memory 204 (also referred to as non-volatile storage, media, memory storage, memory circuitry, and/or similar terms used herein interchangeably). In some examples, the non-volatile memory 204 may include one or more non-volatile storage or memory media, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile memory 204 may store data, databases, database instances, database management systems, files, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In some embodiments, the computing platform 200 includes, or is in communication with, volatile memory 206 (also referred to as volatile storage, media, memory storage, memory circuitry, and/or similar terms used herein interchangeably). In some examples, the volatile memory 206 may also include one or more volatile storage or memory media, including, but not limited to, RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile memory 206 may be used to store at least portions of the databases, database instances, database management systems, data, applications, programs, program modules, scripts, source code, object code, byte code, compiled code, interpreted code, machine code, executable instructions, and/or the like being executed by, for example, the processing element 202. Thus, the databases, database instances, database management systems, data, applications, programs, program modules, scripts, source code, object code, byte code, compiled code, interpreted code, machine code, executable instructions, and/or the like may be used to control certain aspects of the step/operation of the computing platform 200 with the assistance of the processing element 202 and operating system.

As indicated, in one embodiment, the computing platform 200 may also include one or more network interfaces 208 for communicating with various computing entities (e.g., one or more components of FIG. 1), such as by communicating data, content, information, and/or similar terms used herein interchangeably that may be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the computing platform 200 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the computing platform 200 may include, or be in communication with, one or more input elements, such as a keyboard input, a mouse input, a touch screen/display input, motion input, movement input, audio input, pointing device input, joystick input, keypad input, and/or the like. The computing platform 200 may also include, or be in communication with, one or more output elements (not shown), such as audio output, video output, screen/display output, motion output, movement output, and/or the like.

As indicated, the computing platform 200 may be an example of one or more of the components of FIG. 1, such as the exchange platform 102 and/or the member platforms 112*a-c*.

b. Example Client Device

Figure 3:
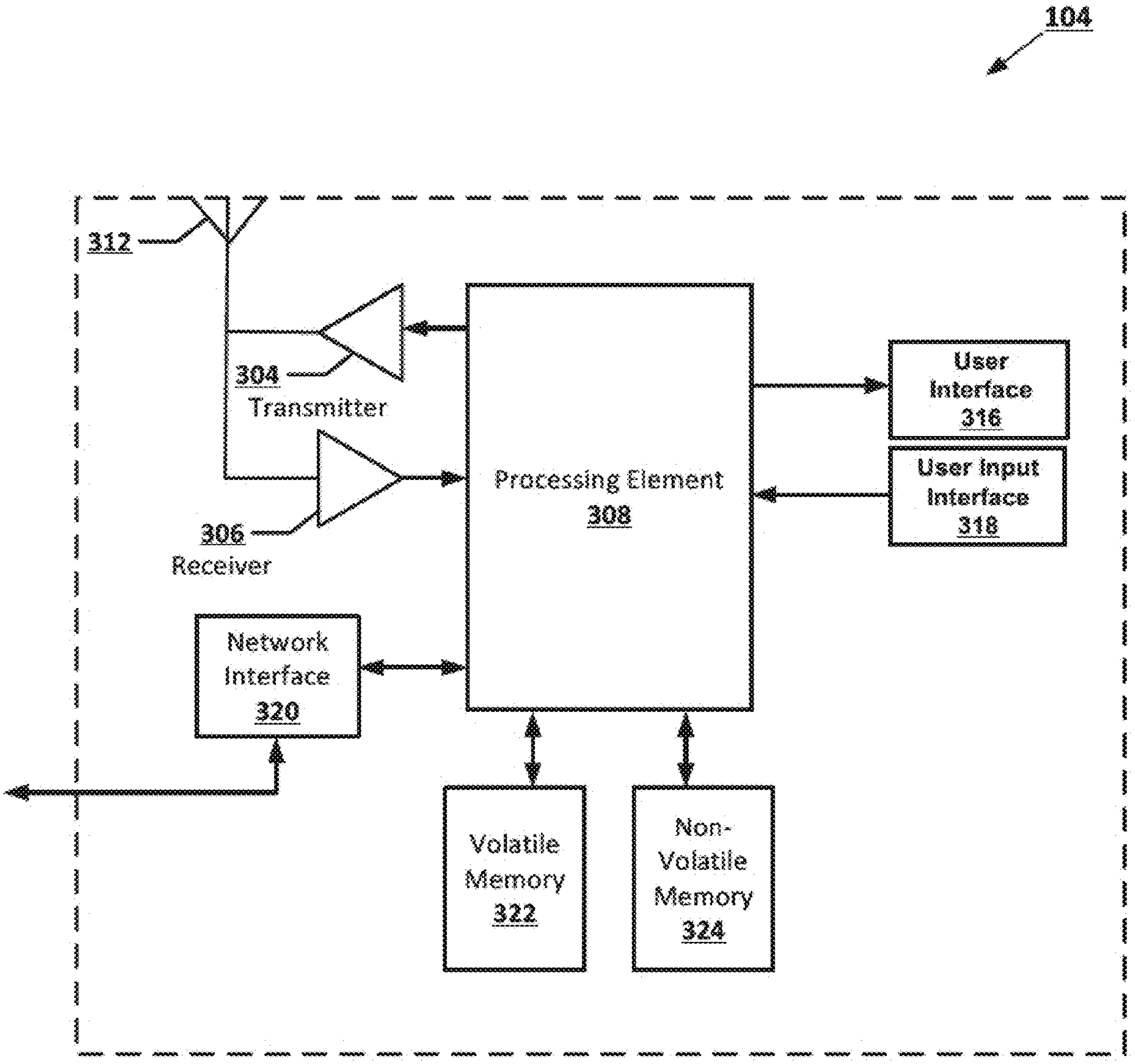
FIG. 3 is an example schematic of a client device in accordance with one or more embodiments of the present disclosure.

FIG. 3 is an example schematic of a client device 104 in accordance with one or more embodiments of the present disclosure. Client devices 104 may be operated by various entities, and an example computing ecosystem may include one or more client devices 104. For example, a client device 104 may be associated with, owned by, operated by, and/or the like by one or more end users. In various embodiments, an end user of a client device 104 may wish to engage in a value exchange between a partner and a service provider. As described herein, the user may do so by interacting leverage one or functionalities provided by an exchange platform through user input with the client device 104.

For example, a client device 104 may be a personal computing device, smartphone, tablet, laptop, personal digital assistant, and/or the like. In various embodiments, the computing platform 200 may communicate with and manage value exchanges for one or more client devices 104. As shown in FIG. 3, the client device 104 may include an antenna 312, a transmitter 304 (e.g., radio), a receiver 306 (e.g., radio), and a processing element 308 (e.g., CPLDs, microprocessors, multi-core processors, co-processing entities, ASIPs, microcontrollers, and/or controllers) that provides signals to and receives signals from the transmitter 304 and receiver 306, respectively.

The signals provided to and received from the transmitter 304 and the receiver 306, respectively, may include signaling information/data in accordance with air interface standards of applicable wireless systems. In this regard, the client device 104 may be capable of operating with one or more air interface standards, communication protocols, modulation types, and access types. More particularly, the client device 104 may operate in accordance with any of a number of wireless communication standards and protocols, such as those described above with regard to the computing platform 200. In a particular embodiment, the client device 104 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the client device 104 may operate in accordance with multiple wired communication standards and protocols, such as those described above with regard to the computing platform 200 via a network interface 320.

Via these communication standards and protocols, the client device 104 may communicate with a computing platform 200 using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The client device 104 may also download changes, add-ons, and updates, for instance, to its firmware, software (e.g., including executable instructions, applications, program modules), and operating system.

In some embodiments, the client device 104 includes location determining aspects, devices, modules, functionalities, and/or similar words used herein interchangeably. For example, the client device 104 may include outdoor positioning aspects, such as a location module adapted to acquire, for example, latitude, longitude, altitude, geocode, course, direction, heading, speed, universal time (UTC), date, and/or various other information/data. In one embodiment, the location module may acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data may be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data may be determined by triangulating the position of the client device 104 in connection with a variety of other systems, including cellular towers, Wi-Fi access points, and/or the like. Similarly, the client device 104 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects may be used in a variety of settings to determine the location of someone or something to within inches or centimeters.

In some embodiments, the client device 104 may include a user interface 316 (e.g., a display screen, a speaker, a tactile mechanization, etc. coupled to a processing element 308) and/or a user input interface 318 (e.g., a touch screen, a microphone, etc. coupled to a processing element 308). For example, the user interface 316 may be a present one or more application screens presented by one or more computing platforms described herein. The user input interface 318 may include any of a number of devices or interfaces allowing the client device 104 to receive data, such as a keypad (hard or soft), a touch display, voice/speech or motion interfaces, or other input device. In examples including a keypad, the keypad may include (or cause display of) the conventional numeric (0-9) and related keys (#, *), and other keys used for operating the client device 104 and may include a full set of alphabetic keys or set of keys that may be activated to provide a full set of alphanumeric keys. In addition to providing input, the user input interface may be used, for example, to activate or deactivate certain functions, such as screen savers and/or sleep modes.

The client device 104 may also include volatile memory 322 and/or non-volatile memory 324, which may be embedded and/or may be removable. For example, the non-volatile memory 324 may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory 322 may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory may store databases, database instances, database management systems, data, applications, programs, program modules, scripts, source code, object code, byte code, compiled code, interpreted code, machine code, executable instructions, and/or the like to implement the functions of the client device 104. As indicated, this may include a partner application, service provider application, and/or the like that is resident on the client device 104 and/or accessible through a browser or other user interface for communicating with a computing platform 200.

In some embodiments, the client device 104 may include one or more components or functionality that are the same or similar to those of a computing platform 200, as described in greater detail above. As will be recognized, these architectures and descriptions are provided for example purposes only and are not limited to the various embodiments.

In various embodiments, the client device 104 may be embodied as an artificial intelligence (AI) computing entity, such as an Amazon Echo, Amazon Echo Dot, Amazon Show, Google Home, and/or the like. Accordingly, the client device 104 may be configured to provide and/or receive information/data from an end user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

c. Example Networks

In some embodiments, any two or more of the illustrative components of the computing ecosystem 100 of FIG. 1 may be configured to communicate with one another via respective communicative couplings to one or more networks 120. The networks 120 may include, but are not limited to, any one or a combination of different types of suitable communications networks such as, for example, cable networks, public networks (e.g., the Internet), private networks (e.g., frame-relay networks), wireless networks, cellular networks, telephone networks (e.g., a public switched telephone network), or any other suitable private and/or public networks. Further, the networks 120 may have any suitable communication range associated therewith and may include, for example, global networks (e.g., the Internet), MANs, WANs, LANs, or PANs. In addition, the networks 120 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof, as well as a variety of network devices and computing platforms provided by network providers or other entities.

d. Example Value Exchange System

Figure 4:
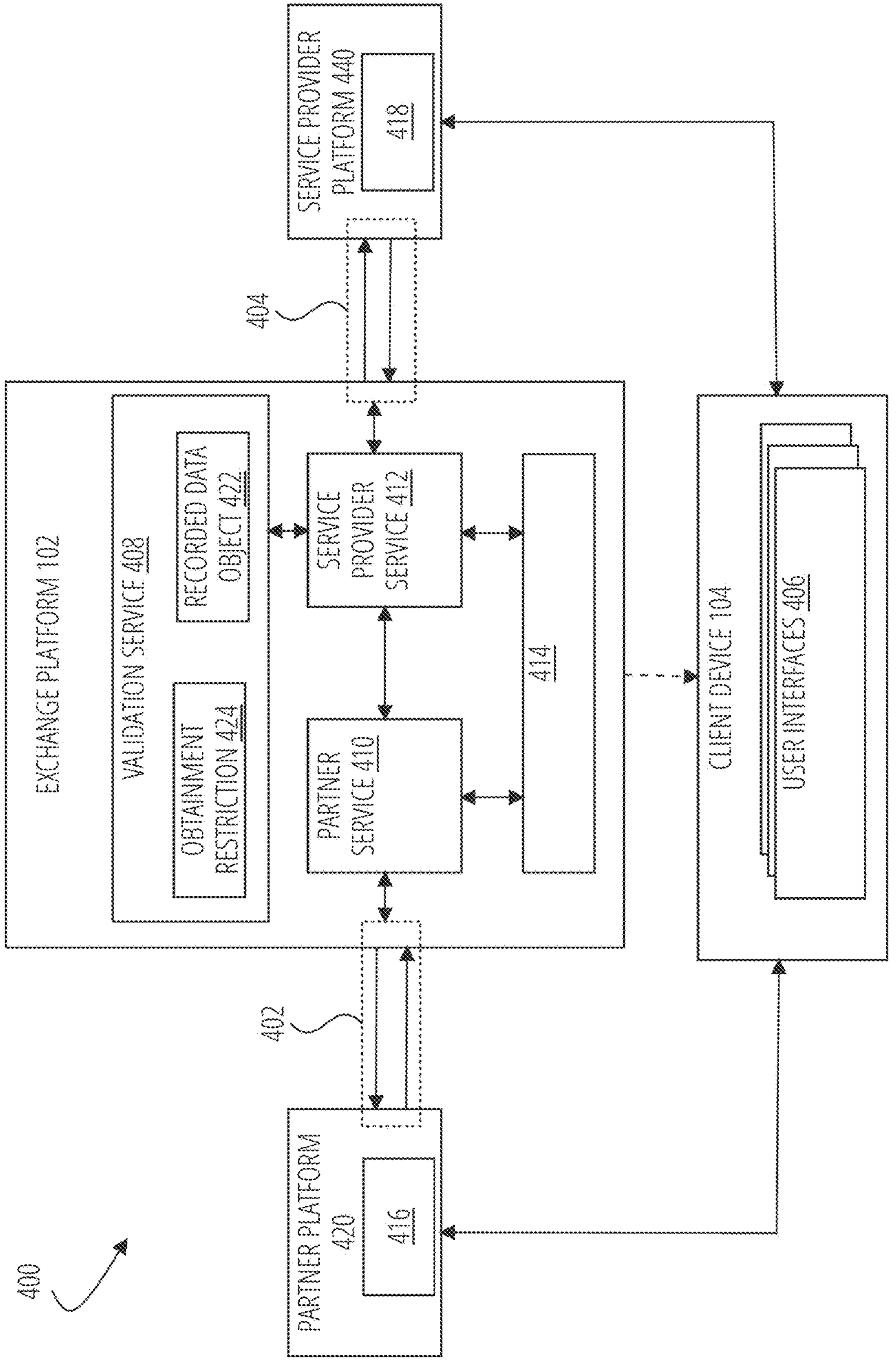
FIG. 4 is an example block diagram of an example credential-less value exchange system in accordance with one or more embodiments of the present disclosure.

FIG. 4 is an example block diagram of an example network-based exchange system 400 in accordance with one or more embodiments of the present disclosure. The network-based exchange system 400 includes a new computing ecosystem and computing platforms that provide an end-to-end value exchange solution to replace traditional exchange processing systems. As described herein, the network-based exchange system 400 may be value system agnostic and may be applied to any value-based exchange including, as examples, information-based exchanges, financial-based exchanges, reputation-based exchanges, healthcare-based exchanges, benefit-based exchanges, and/or the like. In any value system, the network-based exchange system 400 may leverage an intermediary entity and one or more defined communication interfaces to facilitate a network-based exchange between a value seeking entity (e.g., a partner) and a value providing entity (e.g., a service provider) that may be associated with one or more member platforms of the network-based exchange system 400.

As depicted, the network-based exchange system 400 may include an exchange platform 102, a partner platform 420, and/or a service provider platform 440 that may be configured to communicate through one or more exchange interfaces. The partner platform 420 and/or service provider platform 440 may include one or more member platforms 112*a-c* from the network of member platforms 110. For instance, the partner platform 420 and the service provider platform 440 may include a single member platform (e.g., member platform 112*c*). In addition, or alternatively, the partner platform 420 and the service provider platform 440 may include one or more different member platforms (e.g., member platforms 112*a* and 112*b*). In some examples, a user may interact with one or more of the platforms through a client device 104.

In some embodiments, the exchange platform 102 is a computing entity that is configured to facilitate a credential-less exchange of value for one or more members in a network. The exchange platform 102 may include one or more processing devices, memory devices, and/or the like that are physically and/or wirelessly coupled and configured to collectively (and/or individually) perform the one or more computing tasks for facilitating a value system agnostic exchange. In some examples, the exchange platform 102 may include, define, and/or otherwise leverage one or more exchange interfaces for facilitating communications (e.g., requests, responses, etc.) between a plurality of members. As described herein, the interfaces may be leveraged to facilitate a secure exchange between one or more members in any value system.

In some embodiments, the member is an entity that collaborates with the exchange platform 102 to take part in an exchange of value. As examples, a member may include (i) a partner that utilizes the exchange platform 102 to receive value, (ii) a service provider that utilizes the exchange platform 102 to provide value, and/or (iii) both a partner and a service provider. As used herein, a member may be referred to as a partner when it receives value through a value exchange and/or a service provider when it provides value through a value exchange. Thus, the same member may be a partner or a service provider depending on the role of the member in a value exchange. For example, a member may be a partner that receives value for a value exchange. The same member may be a service provider that provides value in another value exchange. In some examples, the same member may be both the partner and the service provider in the same value exchange, such that the member utilizes the exchange platform 102 to provide and then receive value in a sole member value exchange.

In some embodiments, a member is a partner when it utilizes a service provided by a service provider. A partner may include any value seeking entity in any value system. As an example, in a financial value system, a partner may include a merchant (e.g., retailer, brick-and-mortar establishment, etc.) that may utilize a service provider, such as a financial institution, to access funds for a financial transaction. In addition, or alternatively, in an information value system, a partner may include a news publisher (e.g., a newspaper, media organization, etc.) that may utilize a service provider, such as a news agency (e.g., wire service, news service, etc.) to access information for an information transaction. In a healthcare value system, a partner may include a healthcare provider that may access a healthcare benefits administrator to access medical benefits for funding a medical operation. As will be understood, the techniques of the present disclosure may be applied to any value system and the partner may include any value seeker for any respective value system.

In some embodiments, a member is a service provider when it provides a service for a partner. A service provider may include a source of value in any value system. As an example, in a financial value system, a service provider may include a financial institution (e.g., bank, currency exchange, credit union, etc.) that may provide access to funds for a financial transaction between one or more entities. In addition, or alternatively, in an information value system, a service provider may include a news agency (e.g., wire service, news service, etc.) that may source information for publication by a news publisher. In a healthcare value system, a service provider may include a healthcare benefits administrator that may provide access to medical benefits for a healthcare provider. As will be understood, the techniques of the present disclosure may be applied to any value system and the service provider may include any source of value for any respective value system.

In some embodiments, a service provider instrument is a mechanism leveraged by a service provider for providing value on behalf of a particular user. The service provider instrument may depend on the value system and/or service provider. In some examples, the service provider instrument may include an account with the service provider. For example, in a financial value system, a service provider instrument may include a bank account (e.g., checking, saving, etc.), brokerage account, line of credit, and/or the like. In an information value system, the service provider instrument may include a subscriber account, and/or the like. In a healthcare value system, the service provider instrument may include a health care benefits account, and/or the like.

In some embodiments, a service provided by a service provider is subject to one or more policies. For instance, a service provider may be associated with one or more member policies for validating the use of a service provider instrument maintained by the service provider.

For example, a service provider and/or a service provider instrument thereof may be associated with an entity that governs the use of one or more services provided by the service provider. By way of example, the service provider may facilitate an electronic benefit transfer (EBT) system, such as supplemental nutrition assistance program ("SNAP"), temporary assistance for needy families ("TANF"), special supplemental nutrition program for women, infants, and children ("WIC"), and/or the like, that provides financial aid for authorized food and household items. As another example, the service provider may facilitate a healthcare plan on behalf of a health care provider that restricts benefits according to healthcare eligibility, procedure codes, procedure location, and/or the like.

In addition, or alternatively, a service provider may govern the use of its own services. For instance, the service provider may maintain a service provider instrument for a user of the service provider. The service provider may restrict the service provider instrument on behalf of the user, on behalf of one or more internal policies, and/or the like. By way of example, the service provider may include a financial institution that allows one or more users to restrict access to funds provided by the financial institution. In this manner, a user may provide limited access to a service provider instrument by establishing one or more member policies for a service provider instrument.

A service provider and a partner may communicate through one or more respective member platforms that are respectively associated with the entities. As one example, a service provider may be associated with a service provider platform 440 and a partner may be associated with a partner platform 420.

In some embodiments, a member platform is a computing entity corresponding to a member associated with the exchange platform 102. The member platform may include a partner platform 420 acting on behalf of a partner, a service provider platform 440 acting on behalf of a service provider, and/or both. In some examples, a member platform may be both a partner platform 420 and a service provider platform

440. For example, the same member platform may be configured to operate on behalf of a partner for one value exchange and a service provider for another value exchange. In some examples, the same member platform may be configured to operate on behalf of both a partner and service provider in a single value exchange. It is noted that the term member platform may refer to a partner platform 420, a service provider platform 440, or both and, in some examples, may depend on the role of the member platform in a value exchange (e.g., and/or one or more interfaces utilized by the member platform in the value exchange).

In some embodiments, the partner platform 420 is a computing entity that is configured to perform one or more operations on behalf of a partner. The partner platform 420, for example, may include one or more processing devices, memory devices, and/or the like that are physically and/or wirelessly coupled and configured to collectively (and/or individually) perform the one or more computing tasks for requesting value in a value system agnostic exchange. In some examples, the partner platform 420 may include, define, and/or otherwise leverage one or more exchange interfaces for facilitating communications (e.g., requests, responses, etc.) with the exchange platform 102. In some examples, the partner platform 420 may be configured to host one or more user-facing applications (e.g., a partner application, etc.) for interacting with one or more users.

The partner platform 420, for example in a financial value system, may host an online marketplace for the partner that allows a user to interact (e.g., search, browse, purchase, return, etc.) with one or more products or services offered by the partner. In the event of a product purchase, the partner platform 420 may cooperate with one or more service providers to access funds for the purchase. Traditionally, access to funds from a service provider is facilitated using a card number, account number, and/or another financial credential that may expose a user to malicious parties. To address network security and data privacy concerns with traditional financial systems (and/or other value-based systems), the partner platform 420 may register with the exchange platform 102 by configuring one or more software development kits (SDKs), APIs, and/or the like for facilitating communications with the exchange platform 102. For example, the partner platform 420 may include, define, and/or otherwise leverage one or more partner interface 402 for facilitating communications (e.g., requests, responses, etc.) with the exchange platform 102.

In some embodiments, the service provider platform 440 is a computing entity that is configured to perform one or more operations on behalf of a service provider. A service provider platform 440, for example, may include one or more processing devices, memory devices, and/or the like that are physically and/or wirelessly coupled and configured to collectively (and/or individually) perform the one or more computing tasks for providing value in a value system agnostic exchange. In some examples, a service provider platform 440 may include, implement, and/or otherwise leverage one or more interfaces for facilitating communications (e.g., requests, responses, etc.) with the exchange platform 102. In some examples, a service provider platform 440 may be configured to facilitate one or more service provider instruments. In some examples, the service provider platform 440 may be configured to host one or more user-facing applications (e.g., a service provider applications, etc.) for managing the one or more service provider instruments.

In some examples, the service provider platform 440, for example in a financial value system, may maintain one or more financial assets (e.g., lines of credit, bank accounts, etc.) that allow a user to fund an exchange for purchasing a product from a partner. In the event of a product purchase, the service provider platform 440 may cooperate with partner platform 420 to authorize an exchange and/or otherwise provide access to funds for the purchase. Traditionally, access to funds from the service provider is facilitated by presenting a card number, account number, and/or another financial credential to the service provider platform 440 which may expose a user, service provider, or partner to malicious parties, especially when provided over an unsecure network (e.g., public network, and/or the like). To address network security and data privacy concerns with traditional financial systems (and/or other value-based systems), the service provider platform 440 may register with the exchange platform 102 by configuring one or more software development kits (SDKs), APIs, and/or the like for facilitating communications with the exchange platform 102. For example, the service provider platform 440 may include, implement, and/or otherwise leverage one or more service provider interfaces 404 for facilitating communications (e.g., requests, responses, etc.) with the exchange platform 102.

As described herein, a service provider interface 404 may enable the exchange platform 102 to identify and request the use of a service provider instrument for facilitating a transaction. For example, the service provider platform 440 may be configured to facilitate one or more service provider instruments. In some examples, a service provider instrument may include a virtual instrument (e.g., virtual account, line of credit, etc.) hosted by a service provider platform 440. For instance, the service provider platform 440 may be configured to maintain a plurality of instrument data objects indicative of a plurality of service provider instruments for a plurality of affiliated entities.

In some embodiments, an instrument data object is a data entity that represents a service provider instrument. The instrument data object may include one or more instrument identifiers and/or one or more instrument attributes. In some examples, the one or more instrument identifiers and/or one or more instrument attributes may be based at least in part on a type of instrument data object. By way of example, a service provider instrument may be represented in a member platform (e.g., the service provider platform 440) as a member instrument data object. In addition, or alternatively, the service provider instrument may be independently represented by a system instrument data object in an exchange platform 102. In some examples, the member instrument data object and the system instrument data object may include one or more of the same one or more instrument identifiers and/or one or more instrument attributes. By way of example, a member platform may register a plurality of service provider instruments with the exchange platform 102 (e.g., using a service provider interface 404). During registration, the member platform (e.g., service provider platform 440) may provide one or more of the instrument identifiers and/or instrument attributes and, in some examples, the exchange platform 102 may return another identifier.

In some embodiments, the member instrument data object is an internal representation of a service provider instrument within a member platform, such as the service provider platform 440. The member instrument data object may include one or more instrument identifiers, such as a member instrument identifier, an instrument key from the exchange platform 102, and/or a user identifier. The user identifier, for example, may include a member user identifier, as described herein. In addition, or alternatively, the member instrument data object may include one or more instrument attributes, such as an instrument type (e.g., credit-based instrument, debit-based instrument, information-based instrument, etc.), an instrument representation, and/or one or more contextual attributes. In some examples, the contextual attributes may depend on the value system. For instance, in a financial value system, the one or more contextual attributes may be indicative of a (i) currency associated with the service provider instrument, (ii) an asset availability (e.g., a balance, coverage, etc.) of the service provider instrument, (iii) one or more previous transactions with the service provider instrument, and/or the like.

In some embodiments, the system instrument data object is an external representation of a service provider instrument within the exchange platform 102. The system instrument data object may include one or more instrument identifiers, such as an instrument reference for a member platform, a system instrument identifier, and/or a user identifier. The user identifier, for example, may include a system user identifier, as described herein. In addition, or alternatively, the system instrument data object may include one or more instrument attributes, such as an instrument type (e.g., credit-based instrument, debit-based instrument, information-based instrument, etc.), an instrument representation, and/or one or more contextual attributes. In some examples, the contextual attributes may depend on the value system. For instance, in a financial value system, the one or more contextual attributes may be indicative of a currency associated with the service provider instrument.

In some examples, a member platform, such as the partner platform 420 and/or service provider platform 440, may be associated with a user-facing application for facilitating one or more interactions with a user and/or other affiliated entity (e.g., through the client device 104).

In some embodiments, the user-facing application is a computer program hosted by a computing entity for facilitating one or more user interactions. A user-facing application may include software (e.g., computer readable instructions, etc.) designed to perform one or more computing tasks for a computing entity, such as a member platform. For instance, a user-facing application may facilitate communication between a member and a user. As examples, the user-facing application may be configured to present one or more user interfaces 406 (e.g., via a client device 104) for interacting with a user on behalf of a member. In some examples, the user-facing application may be configured to receive user input (e.g., via the one or more user interfaces 406) to receive information from a user.

In some embodiments, a user-facing application is a partner application 416 that is hosted by the partner platform (e.g., a member platform acting as a partner for a particular exchange, etc.) to facilitate functions for a partner. A partner application may include software (e.g., computer readable instructions, etc.) designed to perform one or more computing tasks for a partner. In some examples, the partner application 416 may be configured with one or more devices (e.g., point of sale terminals, etc.) from a standalone partner establishment (e.g., a brick and mortar bank, etc.). For instance, a partner application 416 may be configured to present one or more user interfaces 406 for interacting (e.g., browsing, purchasing, reviewing, etc.) with one or more products offered by a retail-based partner, one or more units of information offered by an information-based partner, and/or the like. In some examples, the partner application 416 may be configured to receive user input (e.g., via one or more user interfaces 406) to receive information from a user.

In some embodiments, the service provider platform 440 is configured to host one or more service provider applications 418 for managing one or more service provider instruments. For example, a user-facing application may be a service provider application 418 that is hosted by the service provider platform 440 (e.g., a member platform acting as a service provider for a particular exchange, etc.) to facilitate functions for the service provider. In some examples, the service provider application 418 may be configured with one or more devices from a standalone service provider establishment (e.g., a brick and mortar bank, etc.). A service provider application 418 may include software (e.g., computer readable instructions, etc.) designed to perform one or more computing tasks for a service provider. For instance, a service provider application 418 may be configured to present one or more user interfaces for interacting (e.g., reviewing, managing, auditing, enrolling, etc.) with one or more service provider instruments facilitated by the service provider. By way of example, in a financial value system, the service provider application 418 may enable access to a bank account, brokerage account, line of credit, and/or the like, to manage funds, assets, and/or the like, handled by the respective accounts. In some examples, the service provider application 418 may be configured to receive user input (e.g., via the one or more user interfaces 406) to receive information, authorizations, and/or the like from a user.

In some embodiments, the exchange platform 102 facilitates communication between the partner platform 420 and the service provider platform 440 using one or more exchange interfaces.

In some embodiments, an exchange interface is a set of instructions for facilitating communications between the exchange platform 102 and one or more member platforms and/or internal services. An exchange interface may include an API, file based interface, a message queue based interface, and/or the like. For instance, an exchange interface may include an API including, as examples, one or more simple object access protocol (SOAP) APIs, one or more remote procedure call (RPC) APIs, one or more websocket APIs, one or more representational state transfer (REST) APIs, and/or the like. In some embodiments, an exchange interface may include one or more RPC APIs, such as one or more gRPC APIs.

The exchange platform 102 may include, define, and/or otherwise leverage one or more different exchange interfaces for facilitating communication with one or more external platforms, such as one or more member platforms (e.g., a partner platform 420, service provider platform 440, etc.). Each interface may include a plurality of communication instructions, message definitions, and/or the like for exchanging requests and/or responses between the exchange platform 102 and an entity that is taking part in a value exchange. By way of example, an exchange interface may include a partner interface 402 for facilitating communication with a partner platform 420 and/or a service provider interface 404 for facilitating communication with a service provider platform 440.

In some embodiments, the partner interface 402 is an exchange interface for facilitating one or more communications between a partner platform 420 and the exchange platform 102. The partner interface 402 may define one or more communication instructions, message definitions, and/or the like for facilitating one or more request messages and/or response messages between a partner platform 420 and the exchange platform 102. The partner interface 402, for example, may include an API that defines (i) requests to the exchange platform 102 from a computing entity acting as a partner platform 420 and/or (ii) requests from the exchange platform 102 to the partner platform 420. For example, the partner interface 402 may define one or more registration messages, session messages, transaction messages, and/or the like for facilitating an exchange of value for the partner. In some embodiments, the partner interface 402 defines one or more identifiers for securely identifying one or more portions of a value exchange.

In some embodiments, the service provider interface 404 is an exchange interface for facilitating one or more communications between a service provider platform 440 and the exchange platform 102. The service provider interface 404 may define one or more communication instructions, message definitions, and/or the like for facilitating one or more request messages and/or response messages between a service provider platform 440 and the exchange platform 102. The service provider interface 404, for example, may include an API that defines (i) requests to the exchange platform 102 from a computing entity acting as a service provider platform 440 and/or (ii) requests from the exchange platform 102 to the service provider platform 44. The service provider interface 404, for example, may define one or more registration messages, session messages, transaction messages, and/or the like for facilitating an exchange of value using a service provider instrument. In some embodiments, the service provider interface 404 defines one or more identifiers for securely identifying one or more portions of a value exchange.

The exchange platform 102 may facilitate communications between a network of member platforms. The network of members, for example, may include a plurality of entities that have been onboarded with the exchange platform 102 by, for example, registering with the exchange platform 102, configuring a respective interface for communicating with the exchange platform 102, and/or the like. In some examples, the exchange platform 102 may execute one or more individual services for interacting with each onboarded entity. The individual services, for example, may include one or more partner services 410 and/or service provider services 412.

In some embodiments, the exchange platform 102 instantiates a separate partner-specific service, the partner service 410, for each of the network of members. In addition, or alternatively, for example in a multi-tenant environment, the partner service 410 may be instantiated for one or more partners from the network or members. The partner service 410 may be configured to execute one or more exchange operations for resolving exchange requests from a partner platform 420. In some embodiments, the exchange platform 102 instantiates a separate service provider-specific service, the service provider service 412, for each of the network of members. In addition, or alternatively, for example in a multi-tenant environment, the service provider service 412 may be instantiated for one or more service providers from the network of members. The service provider service 412 may be configured to execute one or more exchange operations for acquiring and resolving an exchange request from a partner platform 420. The exchange operations may include any of the steps and/or operations described herein.

In some embodiments, the partner service 410 and/or the service provider service 412 interact, through one or more local communication mechanisms, with each other and/or one or more other components of the exchange platform 102 to perform an exchange operation. For example, the exchange platform 102 may include a validation service 408. The validation service 408 may be configured to perform one or more validation operations of the present disclosure to validate one or more objects of an exchange request. In this manner, an exchange platform 102 may pre-process objects of an exchange request on behalf of a member platform.

In some embodiments, the validation service 408 is configured to identify one or more restricted objects from an exchange request and validate the restricted object based at least in part on user attributes and/or an exchange location corresponding to the exchange request. In some examples, the validation service 408 may identify and/or validate the restricted objects based at least in part on a recorded data object 422 and/or one or more obtainment restrictions 424.

In some embodiments, the recorded data object 422 is a data object that represents an object that may be involved in a value-based exchange. In some examples, a recorded data object 422 may be an internal representation of an object for an exchange platform. For example, an object may include a distinct unit of a value-based exchange for which value is being transferred. A recorded data object 422 for the object may include a data object that records one or more aspects (e.g., object identifiers, object attributes, etc.) of the object.

For instance, a recorded data object 422 may include an object identifier and/or one or more object attributes for a particular object associated with a value system. The object may be based at least in part on the value system. For instance, in a financial value system, an object may be a tangible or intangible item, product, and/or the like that may be purchased in exchange for a unit of currency. In a healthcare value system, an object may be a healthcare procedure, and/or the like that may be covered by a healthcare policy.

In some examples, the exchange platform 102 may maintain and/or have access to an object datastore that includes a plurality of recorded data objects 422. As described herein, the object datastore may include a plurality of recorded data objects 422 that are at least partially sourced from one or more members of the exchange network and/or one or more third parties. In some examples, the object datastore may include at least a portion of the platform data vault 414

In some embodiments, the object datastore is generated, updated, and/or maintained using data from one or more external data sources. For example, the one or more external data sources may include one or more object catalogs. Each object catalog may include a plurality of object identifiers and/or object attributes for each object identifier. By way of example, an object catalog may include a ten, twenty, forty, or more data points for each of a plurality of object identifiers. Each data point may be indicative of an object attribute for an object. The object attributes may be sourced, by the external data sources, from a manufacturer, supplier, and/or any other entity associated with a particular object. In some examples, the object datastore may be aggregated from each of one or more different external data sources to aggregate, verify, and/or augment a plurality of recorded data objects 424 associated with a plurality of different entities.

In some embodiments, an object attribute is a data entity that describes a characteristic of an object. An object attribute may include an object-based attribute and/or an exchange-based attribute.

For instance, an object-based attribute may include a spatial attribute, a count attribute, a value attribute, a source attribute, a composition attribute, a categorical attribute, and/or any other attribute that is descriptive of an object characteristic. A spatial attribute, for example, may be indicative of one or more dimensions (e.g., height, width, weight, etc.) of an object, value attribute may be indicative of a value (e.g., price, etc.) of the object, a composition attribute may be indicative of one or more ingredients, components, etc. of the object, a categorical attribute may be indicative of one or more categories (e.g., restricted substances, etc.) of the object, and/or the like. By way of example, one or more categorical attribute may be indicative whether an object is associated with (i) one or more general store categories, such as vegetables, fruits, dairy, meat, grains, seeds, alcohol, tobacco, in-store consumable, hot food, pharmacy, pet feed, and non-food, (ii) one or more medical categories, such as a dental, eyecare, general health, etc., (iii) one or more informational categories, such as international sources, domestic sources, etc. and/or the like. In some examples, a composition attribute may be indicative of one or more components of an object, such as a percentage by volume of alcohol within an object, one or more ingredients, such as meat, dairy-derived, peanut-derived, tree nut-derived, soy-derived, and/or the like.

In some examples, an object-based attribute may be based at least in part on the value system. For instance, in at least a financial-based value system, an object-based attribute may include one or more line item attributes, one or more line item adjustments, and/or the like. Line item attributes may include a sequence, a line item group, a product code, an item name, an item source (e.g., provider, manufacturer, etc.,), a description, a quantity, a mass (e.g., gram, kilogram, etc.,), one or more spatial dimensions (e.g., length, width, height, volume, etc.,), a unit amount, a unit tax amount, a line amount (e.g., amount of the line item), a line tax amount, and/or the like. Line item adjustments may include an adjustment type (e.g., manufactures discount, a store discount, a return, a payment cash, a payment gift card, payment other, and/or the like), an item, product, or service code, an item description, an item quantity, a unit-item, an item mass (e.g., gram, kilogram, etc.), a unit amount, a unit tax amount, a line amount (e.g., amount of the line item), a line tax amount, and/or the like.

In some examples, the one or more exchange-based attributes may be indicative of one or more aggregated exchange features. For instance, an exchange-based attribute may include a count attribute that is descriptive of a number of value-based exchanges that involve a particular object. The count attribute, for example, may be indicative of a number of units of a particular object that are obtained through a plurality of value-based exchanges. For example, as described herein, the exchange platform may increment a count attribute for an object each time an object is referenced in a value-based exchange. In some examples, the exchange platform may increment a count attribute for an object each time the object is authorized for obtaining. In some examples, a recorded data object 422 may include a plurality of count attributes that respectively identify a number of units of an object that are obtained (e.g., an obtained count), authorized for obtaining (e.g., an authorized count), and/or requested for obtaining (e.g., a requested count).

In some examples, the one or more exchange-based attributes may include exchange-specific features. For instance, an exchange-based feature may include a source attribute that is descriptive of a location (e.g., retailer, brick and mortar store, healthcare center, informational source, etc.) from which an object is obtained (e.g., purchased, etc.) through a value-based exchange. The location, for example, may include a virtual and/or physical location. In some examples, the location may depend on the value system. For instance, in a financial value system, the source attribute may identify a retailer, a particular brick and mortar store of a retailer, an online platform, and/or the like. In a healthcare value system, the source attribute may be a virtual and/or physical medical center, and/or the like. In an information value system, the source attribute may be an informational source, and/or the like.

In some examples, a recorded data object 422 and/or a count attribute may be source specific. For instance, a different recorded data object 422 and/or count attribute may be maintained for each source from which an object may be obtained. In addition, or alternatively, a recorded data object 422 and/or a count attribute may be source agnostic.

In some embodiments, a restricted object is one or more different types of objects that may be associated with exchange criteria for obtaining through a value-based exchange. A restricted object, for example, may include an object that is subject to one or more obtainment restrictions 424.

In some embodiments, an obtainment restriction 424 is a data entity that defines one or more criteria for validating objects of a value-based exchange. An obtainment restriction 424 may define one or more user-specific, location-specific, and/or other rules for validating a restricted object.

The location-specific rules may include one or more geographic restrictions and/or sovereign entity restrictions. For example, the location-specific rules may be indicative of one or more country, state, county, and/or the like, restrictions on the obtainment of one or more restricted objects in a sovereign entity and/or other geographic region. By way of example, one or more restricted objects may be banned for obtainment by federal laws that may form the basis of an obtainment restriction 424.

The user-specific rules may include one or more age restrictions, residency restrictions, credit score restrictions, and/or the like. In some examples, an age restriction may be indicative of one or more age ranges and/or age thresholds for obtaining a restricted object. For instance, an age restriction may define one or more age categories for one or more restricted objects of different types. Each age category may define an age range (e.g., an age band, etc.) that corresponds to a different type of restricted object. By way of example, a first age category may be indicative of an age range below a minimum age for obtaining a first object, such as tobacco, a second age category may be indicative of an age range above the minimum age range for obtaining tobacco but lower than a second minimum age for obtaining a second object, such as alcohol, and a third category may be indicative of an age range above the second minimum age range.

In some embodiments, an obtainment restriction 424 may be based at least in part on an exchange location associated with a value-based exchange. For instance, a location-specific rules and/or user-specific rules may be modified for different locations. The user-specific rules, for example the one or more age categories and/or the like, may be formed on the basis of one or more legal requirements corresponding to an exchange location.

An obtainment restriction 424 may correspond to an object and/or one or more object attributes. For example, one or more obtainment restrictions 424 may correspond to one or more object identifiers. For instance, a recorded data object 422 for an object may include an indication of the one or more obtainment restrictions 424. In addition, or alternatively, an obtainment restriction 424 may correspond to one or more object attributes. By way of example, an obtainment restriction 424 may correspond to a categorical attribute (e.g., alcohol, tobacco, etc.), a composition attribute (e.g., a percentage of alcohol, etc.), and/or the like.

Through the performance of one or more exchange operations, the partner service 410 and/or service provider service 412 may generate and leverage a plurality of non-traditional identifiers for referencing one or more aspects of a user, a service provider instrument, and/or a value exchange. At least some of these identifiers may include universally unique identifiers, such as a UUEK, that may be leveraged to provide a credential-less value exchange. Each identifier may be at least temporarily stored in a platform data vault 414. The platform data vault 414 may include any type of memory device as described herein. In some examples, each service and/or one or more sets of services may be associated with an individual portion of the platform data vault 414.

As described herein, one or more identifiers may by stored in associated with each other to form identifier mappings that may be leveraged by the exchange platform 102 (and/or one or more services thereof) to reference a user, service provider instrument, and/or any other aspect of a value exchange from communications between the partner platform 420, the service provider platform 440, and/or any other member platform without including user credentials. An example of the non-traditional identifiers will now further be described with reference to FIG. 5.

e. Example Data Structures

Figure 5:
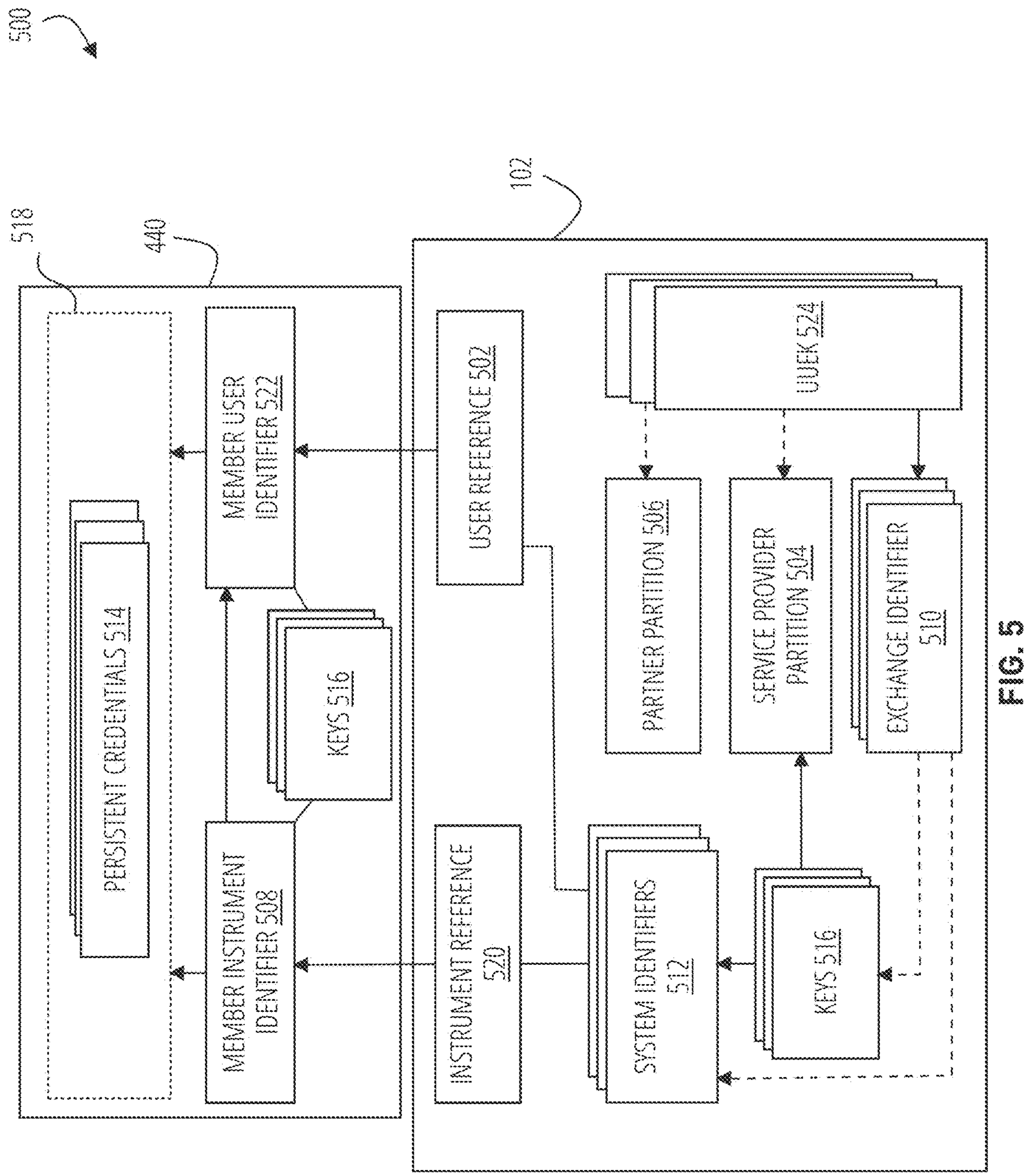
FIG. 5 is an example data diagram for facilitating a credential-less exchange of value in accordance with one or more embodiments of the present disclosure.

FIG. 5 is an example data diagram 500 for facilitating a credential-less exchange of value in accordance with one or more embodiments of the present disclosure. The data diagram 500 illustrates a plurality of related identifiers of different types. As depicted, each identifier may be associated with at least one related identifier to form identifier mappings within one or more platforms, such as the exchange platform 102 and/or a service provider platform 440. The identifier mappings empower communications between the exchange platform 102 and the service provider platform 440 that reference a service provider instrument 518 without exposing persistent credentials 514 (e.g., username, password, card number, etc.) associated with the service provider instrument 518 that are susceptible to fraud, misuse, and exploitation by malicious parties. As illustrated, using some of the techniques of the present disclosure, the persistent credentials 514 may never have to be communicated outside of a service provider platform 440. The data diagram 500 illustrates just some of the plurality of identifiers that may be generated, stored, and/or leveraged by the various embodiments of the present disclosure. It will be understood that the illustrated identifiers are not an exhaustive list and may include other, non-illustrated identifiers. Each of the identifiers may be labeled as an identifier, reference, key, and/or other similar terms. These terms are used herein interchangeably to refer to a unit of information for identifying data structures, entities, and/or any other component described herein.

As illustrated, some of the plurality of related identifiers in various embodiments of the present disclosure may include, as examples, (i) one or more user references 502 that may be mapped to member user identifiers 522 of the service provider platform 440, (ii) one or more service provider partitions 504 corresponding to a network of onboarded service provider platforms, such the service provider platform 440, (iii) one or more partner partitions 506 corresponding to a network of onboarded partner platforms, (iv) one or more instrument references 520 that may be mapped to member instrument identifiers 508 of the service provider platform 440, (v) one or more keys 516 and/or system identifiers 512 that may be associated with the user references 502 and/or instrument references 520, (vi) one or more exchange identifiers 510 that may be mapped to either the system identifiers 512 and/or the keys 516, and/or (vii) one or more UUEKs 524 that may be mapped to the exchange identifiers 510 and/or at least one of a partner partition 506 and/or the service provider partition 504.

In some examples, the service provider platform 440 may store one or more identifiers that may be mapped to a service provider instrument 518 and/or one or more identifier of the exchange platform 102 to enable the service provider platform 440 to reference a service provider instrument 518 based at least in part on identifiers that, by themselves, are not indicative of any aspect of the service provider instrument 518, including the persistent credentials 514 thereof.

By way of example, the service provider platform 440 may store, maintain, and/or otherwise access one or more keys 516 that map to (e.g., is a duplicate of, derivative of, etc.) one or more system identifiers 512 of the exchange platform 102. The keys 516, for example, may include the system identifiers 512 as a portion of the keys 516. The keys 516 may be mapped to member instrument identifiers 508 and/or member user identifiers 522 that may internally reference a user and/or service provider instrument 518 of the service provider platform. The keys 516, for example, may be provided during a registration process between the service provider platform 440 and/or the exchange platform 102.

As another example, the exchange platform 102 may store, maintain, and/or otherwise access one or more references, such as the instrument reference 520 and/or the user reference 502 that map to (e.g., is a duplicate of, derivative of, etc.) one or more member identifiers, such as the member instrument identifier 508 and/or the member user identifier 522 of the service provider platform 440. The references, for example, may be provided during a registration process between the service provider platform 440 and/or the exchange platform 102.

In some embodiments, the exchange platform 102 references each member platform of a network of member platforms using one or more entity partitions. In some embodiments, an entity partition is a unique identifier for a computing entity. An entity partition may include a unique number, alpha-numeric, and/or the like that represents a particular computing entity. An entity partition, for example, may include a member partition that represents a member platform, a service provider partition 504 that represents the service provider platform 440, a partner partition 506 that represents a partner platform 420, and/or the like.

In some embodiments, the service provider partition 504 is a unique identifier for a service provider and/or service provider platform 440 of a service provider. The service provider partition 504 may include a sequence of numeric, alpha-numeric, any/or any other characters or symbols that are representative of a service provider that is associated (e.g., onboarded, registered, etc.) with the exchange platform 102. The exchange platform 102, for example, may include a plurality of service provider partitions that respectively identify a service provider platform 440 that is affiliated with (e.g., onboarded with, registered with, etc.) the exchange platform 102. Each service provider partition 504 may represent a service provider platform 440 that has configured one or more exchange platform software development kits (SDKs), and/or like for implementing a service provider interface of the exchange platform 102.

In some embodiments, the partner partition 506 is a unique identifier for a partner and/or a partner platform of a partner. The partner partition 506 may include a sequence of numeric, alpha-numeric, any/or any other characters or symbols that are representative of a partner that is associated with the exchange platform 102. The exchange platform 102, for example, may include a plurality of partner partitions that respectively identify a partner platform that is affiliated with (e.g., onboarded with, registered with, etc.) the exchange platform 102. Each partner partition 506 may represent a partner platform that has configured one or more exchange SDKs, and/or the like for implementing a partner interface of the exchange platform 102.

In some embodiments, the entity partitions are generated to identify a member when the member platform is onboarded with the exchange platform 102. In some examples, after onboarding with the exchange platform, the member platforms may leverage one or more exchange interfaces to register one or more service provider instruments with the exchange platform 102. A service provider instrument 518 may be registered with the exchange platform 102 by exchanging one or more instrument identifiers with the exchange platform 102.

In some embodiments, an instrument identifier includes any representation of the service provider instrument 518 that identifies the service provider instrument without the exposing persistent credentials 514 of the service provider instrument 518. The instrument identifier may include a member instrument identifier 508, a system instrument identifier, an instrument reference 520, instrument key, and/or the like, as described herein.

In some embodiments, a member instrument identifier 508 is a unique identifier for representing a service provider instrument 518 within a member platform, such as the service provider platform 440. The member instrument identifier 508, for example, may include a sequence of numeric, alpha-numeric, any/or any other characters or symbols that represent a service provider instrument 518 to the service provider platform 440. In some examples, the member instrument identifier 508 may include a table identifier for a member instrument data object.

In some embodiments, the instrument reference 520 is a unique identifier for referencing a member instrument identifier 508. The instrument reference 520, for example, may be generated and/or provided by a member platform to the exchange platform 102 to allow the exchange platform 102 to reference the service provider instrument 518 maintained at the member platform. In some examples, the instrument reference 520 is the same value as the member instrument identifier 508. In some examples, the instrument reference 520 is a different value that is mapped to the member instrument identifier 508.

In some embodiments, a system instrument identifier is a unique identifier for representing a service provider instrument 518 within the exchange platform 102. The system instrument identifier, for example, may include a sequence of numeric, alpha-numeric, any/or any other characters or symbols that represent the service provider instrument 518 to the exchange platform 102 without exposing the persistent credentials 514 of the service provider instrument 518. In some examples, the system instrument identifier may include a UUID. In some examples, the system instrument identifier may include at least one of the system identifiers 512.

In some embodiments, the instrument key is a unique identifier for referencing a system instrument identifier. The instrument key, for example, may be generated and/or provided by the exchange platform 102 during a registration process of the service provider instrument 518 with the exchange platform 102. In some examples, the instrument key may include a wrapped system instrument identifier. For example, the instrument key may include a string of alpha-numeric characters that are formatted according to a key format established by the exchange platform 102 (and/or one or more APIs thereof). The key format may include any number of characters, such as fifty characters or more. In some examples, the characters may be case sensitive. A first portion of the characters (e.g., the first six characters) may be reserved as a partition for identifying an entity associated with the key. For an instrument key, for example, the partition may include the service provider partition 504. A second portion of the characters may identify the system instrument identifier. In some examples, the instrument key may include at least one of the keys 516. The key formats described herein may include one or more different portions, each of which may be arranged in any order.

In some embodiments, after onboarding with the exchange platform 102, a member platform may leverage one or more exchange interfaces to register one or more users with the exchange platform 102. A user may be registered with the exchange platform 102 by exchanging one or more user identifiers with the exchange platform 102. The user identifiers, for example, may be leveraged to generate, maintain, and/or update one or more user data objects reflective of a user of a member platform and/or the exchange platform 102.

In some embodiments, a user data object is a data entity that represents a user that interacts with a member platform and/or the exchange platform 102. A user, for example, may include an entity (e.g., person, organization, group, etc.) that engages in an exchange of value governed by the exchange platform 102. In some examples, the user may indirectly cooperate with the exchange platform 102 by creating a user account with a registered service provider, registering (and/or giving permission to register) a service provider instrument 518, and/or the like. In some examples, the exchange platform 102 may act on the user's behalf without the user directly engaging with the exchange platform 102. For example, the exchange platform 102 may act as a hidden intermediary between a user-facing application and a user's service provider instrument 518.

In some embodiments, a user data object includes one or more user identifiers and/or one or more user attributes. In some examples, the one or more user identifiers and/or one or more user attributes may be based at least in part on a type of user data object. By way of example, a user may be represented in a member platform as a member user data object. In addition, or alternatively, the user may be independently represented by a system user data object in an exchange platform. In some examples, the member user data object and the system user data object may include one or more of the same one or more user identifiers and/or user attributes. By way of example, a member platform may register a plurality of users with the exchange platform 102. During registration, the member platform may provide one or more of the user identifiers and/or user attributes and, in some examples, the exchange platform 102 may return another identifier.

In some embodiments, a member user data object is an internal representation of a user within a member platform, such as the service provider platform 440. The member instrument data object may include one or more user identifiers, such as a member user identifier 522, a user key from the exchange platform 102, and/or the like. In addition, or alternatively, the member user data object may include one or more user attributes. The one or more user attributes may be indicative of one or more contextual characteristics for a user. In some examples, the user attributes may be indicative of one or more identifiable characteristics for a user. By way of example, the user attributes may be indicative of a user's first name, last name, email, physical address (e.g., one or more of a street, locality, region, postal code, country, etc.), birthday (e.g., a birth date, an age band, etc.), phone number, and/or the like. In some examples, the user attributes may include encrypted, hashed, and/or otherwise secured representations of the identifiable characteristics for a user. For instance, the user attributes may include one or more hashed identifiers for the user and/or the like.

In some embodiments, the user attributes may be indicative of an age of a user. The user attributes, for example, may be indicative of a user's birthday. In addition, or alternatively, the user attributes may be indicative of an age band. An age band may be indicative of an age category for a user. For instance, an age category may be indicative of an age range that is tailored to one or more obtainment restrictions. As an example, in the United States, an age band may include (i) an underage band indicative of a user as under 18 years of age, (ii) a first partial underage band indicative of a user that is over 18 but under 19 years of age, (iii) a second partial underage band indicative of a user that is over 19 but under 21 years of age, and (iv) an unrestricted band indicative of a user that is over 21 years of age. In this manner, a user attribute may reflect age related information for a user without exposing sensitive user information, such as a user birth date.

In some embodiments, the system user data object is an external representation of a member's user within the exchange platform 102. The system user data object may include one or more user identifiers, such as a user reference 502 for a member platform, a system user identifier, and/or the like. In addition, or alternatively, the system user data object may include one or more user attributes, such as those described herein. By way of example, a member platform may register a user with the exchange platform 102. During registration, the member platform may provide the user reference 502 for the user and/or the one or more user attributes. In some examples, the user attributes may include hashed and/or encrypted identifiers for the user.

In some embodiments, a user identifier includes a unique identifier for a user involved in a value-based exchange. A user identifier may include a sequence of numeric, alpha-numeric, any/or any other characters or symbols that are representative of a user of the exchange platform 102 and/or a member platform. In some examples, a user identifier may include a user reference 502, a user key, a system user identifier, a member user identifier, and/or the like.

In some embodiments, a system user identifier is a unique identifier for representing a user within the exchange platform 102. The system user identifier, for example, may include a sequence of numeric, alpha-numeric, any/or any other characters or symbols that represent a user to the exchange platform 102. In some examples, the system user identifier may include a UUID specific to a particular user. In some examples, the system user identifier may include at least one of the system identifiers 512.

In some embodiments, a member user identifier 522 is a unique identifier for representing a user within a member platform. The member user identifier, for example, may include a sequence of numeric, alpha-numeric, any/or any other characters or symbols that represent a user to the service provider platform 440.

In some embodiments, a user reference 502 may be a unique identifier for referencing a member user identifier 522. The user reference 502, for example, may be generated and/or provided by a member platform to an exchange platform 102 to allow the exchange platform 102 to reference a user associated with the member platform. In some examples, the user reference 502 is the same value as the member user identifier 522. In some examples, the user reference 502 is a different value that is mapped to the member user identifier 522.

In some embodiments, a user key is a unique identifier for referencing a system user identifier. The user key, for example, may be generated and/or provided by the exchange platform 102 during a registration process of a user with the exchange platform 102. In some examples, the user key may include a wrapped system user identifier. For example, the user key may include a string of alpha-numeric characters that are formatted according to a key format established by the exchange platform (and/or one or more APIs thereof). The key format, for example, may include a first portion of the characters (e.g., the first six characters) that may be reserved as a partition for identifying an entity (e.g., a member, etc.) associated with the key. For example, for a user key, the partition may include a service provider partition 504 and/or a partner partition. A second portion of the characters may identify the system user identifier.

As illustrated by FIG. 5, the keys 516, such as the user and instrument keys described herein, may be shared across the exchange platform 102 and the service provider platform 440. In addition, in some examples, references, such as the instrument reference 520 and user reference 502, may be shared across entities. These identifiers, and the mapping schemes described herein, allow the exchange platform 102 to reference a service provider instrument 518 without knowledge of persistent credentials 514 (e.g., card numbers, etc.) of the service provider instrument 518. As described herein, one or more of the keys 516 and/or references may be provided to the service provider platform 440 individually, or in any combination. In some examples, each of the keys 516 and the references may be provided to the service provider platform 440 in a redundant process that allows the service provider platform to verify that a communication is provided by the exchange platform 102 (e.g., an entity with access to the specific set of keys and references, etc.).

In some embodiments, persistent credentials 514 for a service provider instrument 518 include sensitive user and/or instrument credentials, such as a card number, account number, subscription number, and/or the like, that may expose a user, member, and/or intermediary entity to risk. The persistent credentials 514 may be generated, accessed, and/or otherwise provided by a service provider platform 440 to a user when a user applies for, is authorized for, and/or otherwise is enabled to open a new service provider instrument 518. Traditionally, persistent credentials 514 are then used by the user to initiate value exchanges using the service provider instrument. By doing so, the user is forced to expose sensitive credentials that are tied directly to the service provider instrument 518 each time the service provider instrument 518 is used. The keys 516, references, and identifier mapping scheme of the present disclosure overcome these technical deficiencies.

In some examples, each of the identifiers are interpretable to a computing platform, such as the exchange platform 102 and/or service provider platform 440, but not the user. To enable the user to select a service provider instrument 518 while maintaining the enhanced security features of the present disclosure, in some examples, the identifiers of FIG. 5 may be further enhanced with instrument representations.

In some embodiments, an instrument representation (not depicted by FIG. 5) is a unique identifier for representing a service provider instrument 518 to a user, without exposing the persistent credentials 514 of the service provider instrument 518. The instrument representation, for example, may include a sequence of numeric, alpha-numeric, any/or any other characters or symbols that are outwardly representative of a service provider instrument 518 only to entities with previous knowledge of service provider instrument 518. The format and/or value of an instrument representation may be based at least in part on the type of service provider and/or service provider instrument 518. For instance, in a financial value system, an instrument representation may include a portion (e.g., the last four digits, etc.) of the persistent credentials 514, such as a card number (e.g., debit card, credit card, etc.), a financial account number, and/or the like. As another example, in an information value system, an instrument representation may include a portion (e.g., one or more digits, alpha-numeric characters, etc.) of persistent credentials 514, such as a subscription account, and/or the like. For instance, the instrument representation may include a derivative of persistent credentials 514 that may only allow entities with prior knowledge of the persistent credentials 514 to identify the persistent credentials 514 using the instrument representation. As another example, the instrument representation may include an instrument nickname that is assigned by and thereafter recognized by a user.

In some embodiments, the instrument representation may be provided (e.g., during a registration process) the exchange platform 102 in place of the persistent credentials 514. In this manner, the exchange platform 102 may represent the service provider instrument 518 using the instrument representation without knowledge of the persistent credentials 514 from which the instrument representation may be derived. For example, unlike traditional network-based exchange platforms, the exchange platform 102 may not require the persistent credentials 514 corresponding to a service provider instrument 518 to implement various computing tasks of the present disclosure. This, in turn, allows the exchange platform 102 to operate more flexibly, while storing previously unrecorded contextual data, lowering operational computing costs, and improving user and platform safeguards from infiltration attacks by malicious computing entities.

In some embodiments, the identifier mapping scheme is supplemented by unique ephemeral keys that are issued to member platforms to facilitate secure, real time value exchanges. For example, the exchange platform 102 may facilitate additional layers of network and data security by implementing exchange identifiers 510 for representing aspects of a value-based exchange. Some examples of exchange identifiers 510 may include a service provider-specific exchange identifier and/or the partner-specific exchange identifier. A service provider-specific exchange identifier may include an ephemeral, unique exchange identifier that temporarily represents the service provider instrument 518 and the service provider platform 440. The service provider-specific exchange identifier, for example, may be mapped to the system identifiers 512 for the service provider instrument 518. A partner-specific exchange identifier may include an ephemeral, unique exchange identifier that temporarily represents the service provider instrument 518 and a partner platform. The partner-specific exchange identifier, for example, may be mapped to the keys 516 for the service provider instrument 518 which may be used to identify the service provider platform 440. In some examples, such mapping may be defined by exchange data objects.

In some embodiments, an exchange data object is a data entity that represents an authorized value exchange between one or more members associated with the exchange platform 102. In some examples, the exchange data object may include one or more identifiers and/or one or more exchange attributes. For example, the one or more identifiers and/or one or more exchange attributes may be based at least in part on a type of exchange data object. By way of example, an exchange may be represented in a member platform as a member exchange data object. In addition, or alternatively, the exchange may be independently represented by a system exchange data object in the exchange platform 102. In some examples, the member exchange data object and the system exchange data object may include one or more of the same one or more identifiers and/or exchange attributes. By way of example, using some of the techniques of the present disclosure, the exchange platform 102 may issue one or more unique identifiers to a member platform that may be used to authorize a value exchange.

In some embodiments, the system exchange data object is an internal representation of a value exchange that is intermediated using the exchange platform 102. In some examples, the system exchange data object may include one or more different identifiers and/or exchange attributes depending on the role of the system exchange data object in a value-based exchange.

For example, a system exchange data object may include a service provider-specific exchange data object that corresponds to the service provider platform 440. The service provider-specific exchange data object may include one or more identifiers, such as an exchange identifier 510, system identifiers 512, such as the system user identifier and/or the system instrument identifier, an UUEK 524, and/or the like. In addition, or alternatively, the service provider-specific exchange data object may include one or more exchange attributes, such as an expiration date, a currency (e.g., for a financial value system, etc.), and/or the like.

In addition, or alternatively, the system exchange data object may include a partner-specific exchange data object that corresponds to a partner platform. The partner-specific exchange data object may include one or more identifiers, such as an exchange identifier 510, one or more keys 516, such as an instrument key, an UUEK 524, a member instrument reference (e.g., a partner-specific instrument reference, etc.), and/or the like. In addition, or alternatively, the partner-specific exchange data object may include one or more exchange attributes, such as an expiration date, a currency (e.g., for a financial value system, etc.), an instrument type, and/or the like.

In some embodiments, a member exchange data object is an external representation of a value exchange that is intermediated using the exchange platform 102. The member exchange data object may include one or more identifiers, such as a member exchange identifier, a member instrument identifier 508, an UUEK 524 from the exchange platform 102, and/or the like.

In some embodiments, an exchange identifier 510 is a unique identifier for an exchange of value using the exchange platform 102. The exchange identifier 510 may include a sequence of numeric, alpha-numeric, any/or any other characters or symbols that are representative of at least a user and/or a service provider instrument 518. In some examples, the exchange identifier 510 may include a universally unique identifier (UUID) that may be mapped (e.g., through a series of identifiers, etc.) to a user, a service provider instrument 518, and/or a member registered with the exchange platform 102. In some examples, the exchange identifier 510 may be generated using one or more UUID generators. For instance, the exchange identifier 510 may include sixteen bytes of information generated in accordance with one or more UUID formatting standards, such as UUID v4, and/or the like. Therefore, while the exchange identifier 510 may be leveraged by the exchange platform 102 and/or a member platform for one or more functions, the same exchange identifier 510 will be useless to external parties without a prior association between the exchange identifier 510 and one or more other identifiers. In addition to the prior identifier associations, the exchange identifier 510 may be associated with the exchange platform 102. Thus, even if the exchange identifier 510 is identified by an adverse party, the adverse party would still be required to impersonate the exchange platform 102 in order to use the exchange identifier 510. Moreover, the adverse party would need to update settlement accounts to accounts owned by the adverse party, among a number of other tasks before the exchange identifier 510 may be used adversely. Each of these tasks increase the amount of work necessary to overcome the layers of enhanced security added by the exchange identifier 510. When paired with the ephemeral nature of the exchange identifier 510, these tasks may become prohibitively expensive.

In some examples, the exchange identifier 510 may be externally represented by a UUEK 524. By way of example, to facilitate credential-less exchanges, the exchange platform 102 may issue one or more UUEKs 524 to one or more member platforms. As described herein, the UUEKs 524 may eliminate the reliance on traditional, persistent credentials 514 by identifying aspects of a value exchange through previously mapped data entities.

In some embodiments, a UUEK 524 is an external representation of an exchange identifier 510 that may be issued (e.g., in place of the exchange identifier 510) to an external entity, such as a user, partner platform, and/or service provider platform, and/or the like, to initiate a value-based exchange using the exchange platform 102. To do so, the UUEK 524 may be generated and issued by the exchange platform 102 to the external entity. Each UUEK 524 may include a plurality of values (e.g., up to fifty characters and/or more that may or may not be case sensitive) that represent one or more aspects of a value-based exchange. For example, the plurality of values may be indicative of an exchange identifier 510, a partition (e.g., identifying the recipient of the UUEK 524, etc.), an identifier type, and/or one or more flags. By way of example, an UUEK 524 may include a partner-specific UUEK and/or a service provider-specific UUEK. The partner-specific UUEK may be correlated to a partner-specific exchange data object and may include a partner partition 506, whereas a service provider-specific UUEK may be correlated to a service provider-specific exchange data object and may include a service provider partition 504, as described herein By way of example, an UUEK 524 may be generated in accordance with a key format. The key format may include a plurality of characters including, for example, fifty characters or more that may or may not be case sensitive. A first portion of the characters (e.g., the first six characters) may be reserved as a partition for identifying a recipient of the UUEK 524. The partition, for example, may include a partner partition 506, a service provider partition 504, and/or any other member partition. By way of example, an UUEK 524 may be issued in response to a request from an authorized member, such as an affiliated partner and/or service provider.

In addition, or alternatively, at least one character (e.g., a seventh character) of the key format may identify a format of the UUEK 524. At least another character (e.g., an eighth character) may identify a type of UUEK 524. In some examples, a second portion of the characters may identify an exchange identifier 510 (e.g., a group of twenty-two characters following the eighth character). A third portion of characters may be reserved (e.g., a group of twenty characters following the first portion of characters). An example representation is provided below:

```
ppppppFiGGGGGGGGGGGGGGGGGGGGGGrrrrrrrrrrrrrrrrrrrr
```

where p represents partition characters, F represents a format character, i represents an identifier type character, G represents the exchange identifier 510, and r represents reserved characters. The key format allows for 9.8×10 to the 84 unique permutations, which is more than the number of atoms in the known observable universe. This enables the generation and distribution of new UUEKs 524 on-demand without compromising the security of underlying data to which the UUEKs 524 may be mapped, such as identifiers for a user, an instrument, and/or any other potentially sensitive information.

As described herein, the unique sequences of identifiers and mapping schemes between the identifiers may facilitate a credential-less value exchange system for enrolled and/or unenrolled entities. In some examples, one or more of the identifiers may be generated through a registration or enrollment process configured to establish a cross-entity relationship between a user, partner, and service provider entities. The identifiers of FIG. 5 may be used to enable communication interfaces that act as a transportation vehicle for object-level attributes. The object-level attributes may be leveraged to perform validation operations that are described with reference to FIGS. 6 and 7.

V. Example System Operations

FIG. 6 provides a process flow for facilitating a credential-less exchange of value in accordance with one or more embodiments of the present disclosure. The process flow depicts a network-based process 600 for leveraging some of the communication techniques of the present disclosure to securely adjudicate a value-based exchange at a granular, object level. The process 600 may be leveraged to overcome various limitations, such as lack of flexibility, security, and/or the like, of traditional exchange systems that expose sensitive and persistent credentials to multiple third parties, as described herein. The process 600 may be implemented by one or more computing devices, entities, and/or systems described herein. For example, via the various steps/operations of the process 600, the exchange platform may leverage the communication techniques to overcome the various limitations with traditional mechanisms of exchange by eliminating reliance on static, sensitive credentials to provide greater flexibility and control over value-based exchanges.

FIG. 6 illustrates an example process 600 for explanatory purposes. Although the example process 600 depicts a particular sequence of steps/operations, the sequence may be altered without departing from the scope of the present disclosure. For example, some of the steps/operations depicted may be performed in parallel or in a different sequence that does not materially impact the function of the process 600. In other examples, different components of an example device or system that implements the process 600 may perform functions at substantially the same time or in a specific sequence.

In some examples, the process 600 begins after an enrollment and/or registration process, in which a user and/or member platform may receive an UUEK for facilitating a credential-less exchange of value. For example, as described herein, one or more registration processes may be previously performed between one or more service provider platforms and the exchange platform to register a plurality of service provider instruments with the exchange platform. Thereafter, the exchange platform may generate and issue UUEKs to registered service provider platforms for initiating a value-based exchange using a registered service provider instrument without referencing persistent credentials for the service provider instruments. In addition, or alternatively, an enrollment process may be performed to enroll a registered service provider instrument maintained by a service provider platform with a partner platform. In some examples, the exchange platform may facilitate the enrollment process and, in response to a successful enrollment, generate and issue an UUEK to the partner platform for initiating a future value-based exchange.

In the event that a user wishes to perform a value-based exchange with a partner platform at which the user has an enrolled partner account, the partner platform may look up the enrolled partner account and identify an issued UUEK for the user from the partner account for use in authorizing the value-based exchange. In the event that the user wishes to perform a value-based exchange with a partner platform at which the user does not have an enrolled partner account, the user may present a previously issued UUEK (e.g., issued to a service provider platform, etc.) to the partner platform (e.g., through a partner application, etc.) and the partner platform may use the UUEK for authorizing the value-based exchange. For example, the partner platform may issue an exchange request with the UUEK to the exchange platform to initiate the value-based exchange.

Using some of the communication techniques of the present disclosure, a member platform may issue an exchange request with object-level details that may be adjudicated by the exchange platform. For instance, by replacing the persistent credentials of a service provider instrument with a UUEK, the communication techniques of the present disclosure may provide a transport mechanism for object-level details without compromising the security of a user, a service provider instrument, or a member platform. This enables the exchange platform to act as an adjudication engine to determine object-level insights for an exchange request. In accordance with the steps/operations of the process 600, these insights may be leveraged by the exchange platform to enforce member policies on behalf of member platforms without continuous involvement from the member platforms.

In some embodiments, the process 600 includes, at step/operation 602, receiving an exchange request with an UUEK. For example, the exchange platform (e.g., a partner service, etc. thereof) may receive, using a partner interface, the exchange request for executing a value-based exchange. The exchange request may be indicative of UUEK that includes an exchange identifier. In addition, or alternatively, the exchange request may include one or more request attributes. The one or more request attributes may include one or more object identifiers, object attributes, resolution flags, and/or the like. In some examples, the exchange request may include an exchange location. The exchange location may be indicative of a physical location, such as brick and mortar store, and/or the like, a virtual location, such as an online retail platform, and/or a geographic region, such as a country, state, county, or other region.

The one or more request attributes may include a plurality of object identifiers corresponding to a plurality of objects associated with the value-based exchange. In addition, or alternatively, the one or more request attributes may include one or more object attributes for the plurality of objects. For example, the one or more object attributes may include one or more object-based attributes, such as one or more line item attributes, one or more exchange-based attributes, such as a quantity of the object, a location of the object, and/or the like. For instance, an exchange request may be indicative of the exchange location from which an object is being obtained.

In some examples, the request attributes may be indicative of one or more request resolution flags. A request resolution flag may be indicative of one or more requesting member requirements (e.g., partner requirements, etc.) for the value-based exchange. For instance, one or more request resolution flags may be set by the member of the exchange network that provides the exchange request to the exchange platform. In some examples, a request resolution flag may be indicative of a partial exchange authorization or a full exchange authorization. A partial exchange authorization may authorize the partial completion of a value-based exchange, whereas a full exchange authorization may only authorize a full completion of a value-based exchange. For instance, a full exchange authorization may require the validation of all objects referenced by a value-based exchange.

In some embodiments, the one or more object identifiers and/or object attributes correspond to one or more recorded data objects maintained by the exchange platform. For example, an object identifier of the exchange request may correspond to an object identifier of a recorded data object. In addition, or alternatively, one or more of the object attributes of the exchange request may correspond to one or more object attributes of a recorded data object. In some examples, the exchange platform may identify one or more recorded data objects based at least in part on the one or more object identifiers and/or one or more object attributes. In response to identifying a recorded data object, the exchange platform may increment a count attribute for the object. By way of example, the count attribute for a respective recorded data object may be incremented in response to each exchange request that references an object represented by the recorded data object. In some examples, the count attribute may be one of a plurality of count attributes for the object that enable the exchange platform to aggregate object level insights from across a plurality of different member platforms, locations, and/or the like.

In some examples, the request attributes may be indicative of one or more request resolution flags. A request resolution flag may be indicative of one or more requesting member requirements (e.g., partner requirements, etc.) for the value-based exchange. For instance, the one or more request resolution flags may be set by the member of the exchange network that provides the exchange request to the exchange platform. In some examples, a request resolution flag may be indicative of a partial exchange authorization or a full exchange authorization. A partial exchange authorization may authorize the partial completion of a value-based exchange, whereas a full exchange authorization may only authorize a full completion of a value-based exchange. For instance, a full exchange authorization may require the validation of all objects referenced by a value-based exchange in order to be executed by the exchange platform.

In some examples, the request attributes may include a member exchange reference (e.g., the member platform's reference for the value-based exchange), a channel (e.g., a type of money exchange for a financial value system, such as a push or pull value transfer, a real time payment, etc.), a currency (e.g., for financial value systems, etc.), an organization key (e.g., a platform identifier for a member organization), an organization category (e.g., airline, apparel, etc.), an establishment key (e.g., a platform identifier for a retail location, etc.), a clerk identifier, and/or any other traceable information for a value-based exchange.

In some embodiments, the process 600 includes, at step/operation 604, identifying an exchange data object. For example, the exchange platform (e.g., a partner service, etc. thereof) may identify an exchange data object based at least in part on the exchange identifier of the UUEK. For example, the exchange identifier may correspond to an exchange data object. In some examples, the exchange data object may include at least one of (i) an instrument identifier for a service provider instrument of a member platform and/or (ii) a user identifier for a user associated with the service provider instrument.

For example, as described herein, an UUEK may correspond to a partner platform and/or a service provider platform. By way of example, the UUEK may include a partner partition that identifies a partner platform in the event that the UUEK was issued to a partner platform. In such a case, the UUEK includes an exchange identifier that corresponds to a partner-exchange data object. As another example, the UUEK may include a service provider partition that identifies a service provider platform in the event that the UUEK was issued to a service provider platform. In such a case, the UUEK includes an exchange identifier that corresponds to a service provider-exchange data object. In some examples, the exchange platform may process a UUEK based at least in part on the member partition.

In some embodiments, the exchange platform (e.g., a partner service, etc. thereof) receives a UUEK that includes a partner partition identifying a partner platform. The exchange platform may identify a partner-specific exchange data object using the exchange identifier. The partner-specific exchange data object may include an instrument key corresponding to a service provider instrument of a member platform. The exchange platform may identify the system instrument data object based at least in part on the instrument key. For instance, the exchange platform may identify a member platform based at least in part on a member partition of the instrument key and provide the instrument key to a service (e.g., a service provider service, etc.) that corresponds to the member platform. The service may identify the system instrument data object based at least in part on the instrument key. The system instrument data object may then be leveraged to identify one or more identifiers (e.g., user identifiers, instrument identifiers, etc.) for processing the exchange request.

In some embodiments, the exchange platform (e.g., a partner service, etc. thereof) receives a UUEK that includes a service provider partition identifying a service provider platform. The exchange platform (e.g., a partner service, etc. thereof) may determine that a partner-specific exchange data object is unavailable. In response to this determination, the exchange platform may identify a member platform based at least in part on the service provider partition and provide the UUEK to a service (e.g., a service provider service, etc.) that corresponds to the member platform. The service may identify a service provider-specific exchange data object based at least in part on the exchange identifier of the UUEK. The service provider-specific exchange data object may be leveraged to identify the system instrument data object based at least in part on the member platform and the exchange identifier. The system instrument data object may then be leveraged to identify one or more identifiers (e.g., user identifiers, instrument identifiers, etc.) for processing the exchange request.

In some embodiments, the process 600 includes, at step/operation 606, determining one or more validated and/or invalidated objects for the exchange request. For example, the exchange platform (e.g., a validation service, etc. thereof) may determine one or more validated objects and/or one or more invalidated objects for the exchange request based at least in part on one or more user attributes corresponding to a user. By way of example, a user identifier of an exchange data object may be leveraged to identify a system user data object corresponding to the service provider instrument. As described herein, the system user data object may include one or more user attributes for a user. In some examples, the exchange platform may identify the system user data object corresponding to the exchange request and determine the one or more validated and/or invalidated objects for the exchange request based at least in part on the user attributes corresponding to the user.

In some examples, the exchange platform (e.g., validation service, etc. thereof) may generate a validated data object and/or an invalidated data object for the exchange request. The validated exchange data object may be indicative of one or more validated objects of the exchange request and/or one or more contextual attributes for the one or more validated objects. The invalidated exchange data object may be indicative of one or more invalidated objects of the exchange request and/or one or more contextual attributes for the one or more invalidated objects.

In some embodiments, the process 600 includes, at step/operation 608, determining whether the exchange request includes an invalidated object. For example, the exchange platform (e.g., a validation service, etc. thereof) may determine whether the exchange request includes an invalidated object. In the event that the exchange request does not include an invalidated object, the process 600 proceeds to step/operation 612. In the event that the exchange request does include an invalidated object, the process 600 proceeds to step/operation 610.

In some embodiments, the process 600 includes, at step/operation 610, determining whether the exchange request includes a partial authentication flag. For example, the exchange request may include one or more request resolution flags that are indicative of a partial exchange authorization and/or a full exchange authorization. The exchange platform may determine whether the one or more request resolution flags are indicative of a partial exchange authorization. In the event that a partial exchange authorization is present and at least one validated object is identified, the exchange platform may proceed to step/operation 612, in which an exchange authorization request is provided to a member platform. For example, in the event that at least one validated object is identified, the exchange platform may provide an exchange authorization request to a member platform in response to the determination that the one or more request resolution flags are indicative of a partial exchange authorization. In the event that a full exchange authorization is present and/or at least one validated object is not identified for the exchange request, the exchange platform may proceed to step/operation 616, in which an exchange response is provided to a member platform that is indicative of an exchange denial. In this manner, the process 600 may conserve computing resources by continuously screening exchange requests based at least in part on the object-level characteristics thereof. In this way, the process 600 enables the exchange platform to preliminarily adjudicate an exchange request, thereby reducing computing resource requirements for member platforms that maintain service provider instruments.

In some embodiments, the exchange platform generates an exchange record for the value-based exchange based at least in part on the one or more validated and/or invalidated objects. The exchange record may record one or more attributes of the value-based exchange. In some examples, the exchange record may be stored in a platform data vault. The exchange record, for example, may be stored in association with a system instrument identifier, a system user identifier, and/or the like. The exchange record may be indicative of the one or more validated objects, invalidated objects, object statuses for each of the validated and/or invalidated objects, and/or any other information associated with the value-based exchange.

For example, the exchange platform may record an object status for each object of the exchange request. An object status is a data entity that is indicative of a determination and/or classification of an object with respect to a value-based exchange. For example, an object status for a validated object may include an object eligible status, and/or the like. As another example, an object status for an invalidated object may include an object ineligible status, and/or the like. An object status for an object that was not assessed in view of a member policy may include an object unassessed status. An object status for an object that is not addressed by a member policy may include an object unspecified status. In some examples, an object status may be indicative of an obtainment restriction corresponding to an invalidated object. For instance, an object status may include an object age restricted status, and/or the like.

In some examples, the exchange platform may identify an object of the exchange request that does not correspond to a recorded data object. In such a case, the exchange platform may generate a recorded data object for the object using one or more object attributes for the object from the exchange request, such as an object identifier, and/or the like.

In some embodiments, the process 600 includes, at step/operation 612, providing an exchange authorization request to a member platform. For example, the exchange platform (e.g., a service provider service, etc. thereof) may provide, using a service provider interface, an exchange authorization request to a member platform corresponding to a service provider instrument. The exchange authorization request may be indicative of the instrument identifier and/or the one or more validated objects for the exchange request. By way of example, the exchange platform may generate the exchange authorization request based at least in part on a system instrument data object identified from one or more aspects of the UUEK. The exchange authorization request may include an instrument key and/or an instrument reference from the system instrument data object.

In some examples, the exchange authorization request may be indicative of a user identifier associated with the service provider instrument. By way of example, the exchange platform may generate the exchange authorization request based at least in part on a system user data object identified from one or more aspects of the UUEK. In some examples, the system user data object may be identified based at least in part on a user identifier (e.g., system user identifier) of the exchange data object. In addition, or alternatively, the system user data object may be identified based at least in part on a user identifier (e.g., system user identifier) of the system instrument data object. In some examples, the exchange authorization request may include a user key and/or user reference from the system user data object.

In some embodiments, the exchange authorization request defines a request to a member for executing a value-based exchange. In some embodiments, the exchange authorization request is provided from the exchange platform to a member of the exchange network. The exchange authorization request, for example, may be provided to a service provider of the exchange network in response to the exchange request from a partner of the exchange network. In some examples, the exchange authorization request may be indicative of a validated exchange data object for the exchange request. For example, the exchange authorization request may be indicative of the one or more validated data objects, a validated exchange value, one or more object statuses associated with the one or more validated data objects, and/or the like. In some examples, the exchange authorization request may be indicative of an invalidated exchange data object for the exchange request. For example, the exchange authorization request may be indicative of the one or more invalidated data objects, one or more object statuses associated with the one or more invalidated data objects, and/or the like. For example, the exchange authorization request may be indicative of the exchange record for the value-based exchange.

In some embodiments, the exchange authorization request includes an exchange value that is modified based at least in part on the one or more validated objects of the exchange request. For example, the exchange request may include a plurality of object values corresponding to a plurality of objects associated with the value-based exchange and an initial exchange value for the plurality of objects. The exchange platform may determine an exchange value for the value-based exchange by modifying the initial exchange value based at least in part on one or more of the plurality of object values that correspond to the one or more validated objects. By way of example, the initial exchange value may be modified to include an aggregated value of one or more object values that correspond to the one or more validated objects. The aggregated value, for example, may exclude object values that correspond to the one or more invalidated objects of the exchange request. For instance, the aggregated value may aggregate the plurality of object values for validated objects from the exchange request, while removing all object values from invalidated objects. In this manner, the aggregated value may be indicative of an exchange value for the validated objects that are authorized for obtaining with a particular service provider instrument and that excludes a portion of the initial exchange value corresponding to invalidated objects. In some examples, the exchange platform may provide, using the service provider interface, the exchange authorization request to the member platform. The exchange authorization request is indicative of the exchange value modified with respect to the one or more validated objects.

In this manner, the process 600 may conserve computing resources by continuously screening exchange requests based at least in part on the object-level characteristics thereof. In this way, the process 600 enables the exchange platform to preliminarily adjudicate an exchange request on a granular, object-level to pre-validate object on behalf of a member platform, thereby reducing computing resource requirements for member platforms that maintain service provider instruments.

In some embodiments, the process 600 includes, at step/operation 614, receiving an exchange authorization response. For example, the exchange platform (e.g., a service provider service, etc. thereof) may receive, using the service provider interface, an exchange authorization response that is indicative of at least one of an exchange approval or an exchange denial.

In some embodiments, the exchange authorization response defines a response to an exchange authorization request. In some embodiments, an exchange authorization response is provided to the exchange platform from a member of the exchange network. The exchange authorization response, for example, may be provided by a service provider of the exchange network in response to an exchange authorization request indicative of the one or more validated objects from the exchange request.

In some embodiments, the exchange authorization response is indicative of at least one of an exchange approval or an exchange denial. The exchange authorization response may be based at least in part on a comparison between an exchange value (e.g., modified based at least in part on the validated objects, etc.) and an asset availability of a service provider instrument. For example, responsive to receiving an exchange authorization request, a member may be configured to compare the exchange value to an asset availability of an identified service provider instrument. A value-based exchange may be authorized (e.g., resulting in an exchange approval, etc.) in the event that the asset availability exceeds the exchange value, otherwise the value-based exchange may be denied (e.g., resulting in an exchange denial).

In some embodiments, the exchange authorization response is indicative of one or more contextual response attributes. The one or more contextual response attributes, for example, may be indicative of one or more contributing factors to an exchange authorization response. Contributing factors, for example, may include bad actor risk and/or fraud check, error, full approval, instrument closed, instrument-based risk and/or fraud check, insufficient value, invalid UUEK, limit exceeded (e.g., UUEK or instrument usage limit exceeded), missing line items (e.g., for exchanges of value that do not include validated objects), instrument not found, account not found, pin required, partial approval, member not available, transaction risk and/or fraud check, unsupported operation, user contact member (e.g., a user may need to contact a member, such as a service provider, to resolve an issue), user risk and/or fraud check, and combinations thereof.

In some embodiments, the exchange platform may increment a count attribute for each recorded data object that corresponds to a validated object of an authorized value-based exchange. By way of example, the count attribute for a respective recorded data object may be incremented in response to the authorization of an object represented by the recorded data object. In some examples, the count attribute may be one of a plurality of count attributes for the object that enable the exchange platform to aggregate object level insights from across a plurality of different member platforms, locations, and/or the like.

In some embodiments, the process 600 includes, at step/operation 616, providing an exchange response. For example, the exchange platform (e.g., a partner service, etc. thereof) may provide, using the partner interface, an exchange response based at least in part on the exchange authorization response. The exchange response, for example, may be indicative of the exchange approval, the exchange denial, the one or more validated objects, and/or the one or more invalidated objects for the exchange request.

In some embodiments, the exchange response defines a response to an exchange request. In some embodiments, the exchange response is provided from an exchange platform to the member that provided the exchange request. The exchange response may be indicative of the exchange approval and/or the exchange denial. In addition, or alternatively, the exchange response may be indicative of the validated data object, invalidated data object, and/or contextual response attributes. By way of example, the exchange response may be indicative of the one or more validated objects and/or the one or more invalidated objects for the exchange request.

In some embodiments, the exchange platform updates the exchange record based at least in part on the exchange response. For example, the exchange record may provide contextual information for the exchange request. The contextual information may be indicative of one or more aspects of the exchange request, the exchange response, the exchange authorization request, and/or the exchange authorization request.

FIG. 7 provides a process flow for adjudicating an object of a value-based exchange in accordance with one or more embodiments of the present disclosure. The process flow depicts a network-based process 700 for leveraging an UUEK, a user attributes, and/or recorded data objects to adjudicate objects of a value-based exchange. The process 700 may be leveraged to overcome various limitations of traditional exchange systems that are unable to adjudicate individual objects of a value-based exchange over a network, as described herein. The process 700 may be implemented by one or more computing devices, entities, and/or systems described herein. For example, via the various steps/operations of the process 700, the exchange platform may leverage the adjudication techniques to overcome the various limitations with traditional mechanisms of exchange by enabling more flexible entity to entity network communications.

FIG. 7 illustrates an example process 700 for explanatory purposes. Although the example process 700 depicts a particular sequence of steps/operations, the sequence may be altered without departing from the scope of the present disclosure. For example, some of the steps/operations depicted may be performed in parallel or in a different sequence that does not materially impact the function of the process 700. In other examples, different components of an example device or system that implements the process 700 may perform functions at substantially the same time or in a specific sequence.

In some examples, the process 700 may include one or more sub-operations of step/operation 606 of the process 600 in which the process 600 is configured to determine one or more validated and/or invalidated objects of an exchange request. For example, the process 700 may begin at step/operation 606 and end at step/operation 608.

In some embodiments, the process 700 includes, at step/operation 702, identifying one or more user attributes corresponding to the exchange request. For example, the exchange platform (e.g., a partner service, etc. thereof) may identify the one or more user attributes corresponding to the exchange request. In some examples, the exchange platform may maintain and/or have access to a plurality of system user data objects. Each system user data object may correspond to a user associated with a respective service provider instrument. In some examples, the exchange platform may identify the user attributes based at least in part on the service provider instrument, the exchange request, and/or the UUEK of the exchange request using the unique identifier mapping techniques described herein.

In some embodiments, the system user data object is an external representation of a user within the exchange platform. The system user data object may include one or more user identifiers, such as a user reference for a member platform, a system user identifier, and/or the like. In addition, or alternatively, the system user data object may include one or more user attributes. In some examples, the user attributes may be indicative of an age of a user. The user attributes, for example, may be indicative of a user's birthday. In addition, or alternatively, the user attributes may be indicative of an age band. An age band may be indicative of an age category for a user. For instance, an age category may be indicative of an age range that is tailored to one or more obtainment restrictions. As an example, in the United States, an age band may include (i) an underage band indicative of a user as under 18 years of age, (ii) a first partial underage band indicative of a user that is over 18 but under 19 years of age, (iii) a second partial underage band indicative of a user that is over 19 but under 21 years of age, and (iv) an unrestricted band indicative of a user that is over 21 years of age. In this manner, a user attribute may reflect age related information for a user without exposing sensitive user information, such as a user birth date.

In some embodiments, the process 700 includes, at step/operation 704, identifying an object from an exchange request. For example, the exchange platform (e.g., a partner service, etc. thereof) may identify an object from the exchange request based at least in part on a plurality of object identifiers and/or object attributes of exchange request. The object, for example, may correspond to an object identifier of the plurality of object identifiers. In addition, or alternatively, the object may correspond to one or more object attributes (e.g., line item attributes, etc.) of the exchange request.

In some embodiments, the process 700 includes, at step/operation 706, determining whether validation is required for the object. For example, the exchange platform (e.g., a validation service, etc. thereof) may determine whether an object validation is required for an object based at least in part on one or more object attributes of the object and/or user attributes (e.g., an age band, etc.) corresponding to the exchange request. For instance, an object validation may be required for a restricted object. In some examples, the exchange platform may identify one or more restricted objects from the plurality of objects based at least in part on the one or more object attributes of each the objects.

For example, the exchange platform may determine whether the identified object is a restricted object based at least in part on an object identifier and/or one or more object attributes of the object. For instance, the exchange platform may identify a recorded data object for the object based at least in part on the object identifier and identify whether the object is a restricted object based at least in part on the recorded data object. For example, the recorded data object may be indicative of one or more obtainment restrictions, a restricted status, and/or one or more object attributes indicative of a restricted object.

In addition, or alternatively, the exchange request may include one or more object attributes corresponding to the object and the exchange platform may identify whether the object is a restricted object based at least in part on a comparison between one or more object attributes and one or more obtainment restrictions. By way of example, the one or more obtainment restrictions may correspond to one or more object attributes, such as a composition attribute (e.g., percentage of alcohol, etc.), a categorical attribute (e.g., tobacco, etc.), and/or the like. The one or more object attributes may be indicative of a restricted object in the event that the object attributes include at least one of a composition attribute and/or a categorical attribute that is covered by an obtainment restriction.

In the event that an object validation is not required for the object, the process 700 may return to step/operation 704 to identify another object from the exchange request. In some examples, the process 700 may return to step/operation 704 until each object from the exchange request is identified to determine whether each object is a restricted object. In this manner, the exchange platform may identify one or more restricted objects from the plurality of objects of the exchange request.

In the event that an object validation is required (e.g., the object is a restricted object, etc.), the process 700 may proceed to step/operation 708 of FIG. 7.

In some embodiments, the process 700 includes, at step/operation 708, determining the validity of the restricted object. For example, the exchange platform may determine whether the restricted object is a validated object or an invalidated object based at least in part on a comparison between the one or more user attributes and an obtainment restriction for the restricted object. In some examples, the process 700 may return to step/operation 704 until each object from the exchange request is identified to determine whether each object is a validated or invalidated object. In this manner, the exchange platform may identify one or more validated objects and/or one or more invalidated objects for the exchange request.

In some examples, the restricted object may be associated with one or more obtainment restrictions. The exchange platform may determine whether the object is a validated object and/or an invalidated object based at least in part on a comparison between the one or more user attributes and the one or more obtainment restrictions. As one example, the one or more user attributes may be indicative of an age band for a user. The age band may correspond to at least one category defined by the one or more obtainment restrictions. In the event that the age band (e.g., partial underage band) achieves a category (e.g., 18 to 21) required by the one or more obtainment restrictions, the restricted object may be determined to be a validated object. In the event that the age band (e.g., 18 to 21) does not achieve a category (e.g., over 21) required by the one or more obtainment restrictions, the restricted object may be determined to be an invalidated object. In this manner, in some examples, the one or more validated objects and/or the one or more invalidated objects may be based at least in part on an age band of a user. The same and/or similar analysis may be performed for each restriction defined by the one or more obtainment restrictions.

In some examples, the one or more obtainment restrictions may be based at least in part on an exchange location associated with the value-based exchange. For example, the exchange request may be indicative of an exchange location. The exchange platform may determine the one or more obtainment restrictions based at least in part on the exchange location and apply the one or more obtainment restrictions to the user attributes to determine whether the restricted object is a validated object of an invalidated object. In this manner, the one or more validated objects and/or the one or more invalidated objects for the exchange request may be based at least in part on the exchange location.

In some embodiments, the validated object is an object of a value-based exchange that is authorized in accordance with one or more obtainment restrictions (if applicable). A validated object, for example, may correspond to an object identifier and/or one or more object attributes that do not correspond to a restricted object and/or correspond to a restricted object in a value-based exchange that achieves the obtainment restrictions corresponding to the restricted object. As an example, in a financial value system, a validated object may be a product or service that is eligible for purchase by a user of a service provider instrument at an exchange location. By way of example, a product may be a gallon of milk that may be associated with a SKU code and/or one or more objects attributes, such as "category: dairy," "quantity: 1 gallon," and/or the like. The product may be a validated object for a value-based exchange in the event that no obtainment restrictions apply to the SKU code and/or the one or more object attributes "category: dairy," "quantity: 1 gallon," and/or the like.

In some embodiments, the invalidated object is an object of a value-based exchange that is unauthorized in accordance with one or more obtainment restrictions (if applicable). An invalidated object, for example, may correspond to an object identifier and/or one or more object attributes that correspond to a restricted object in a value-based exchange that does not achieve the obtainment restrictions corresponding to the restricted object. As an example, in a financial value system, an invalidated object may be a product or service that is ineligible for purchase by a user of a service provider instrument at an exchange location. By way of example, a product may be a liter of alcohol that may be associated with a SKU code and/or one or more objects attributes, such as "category: restricted substance," "quantity: liter," and/or the like. The product may be an invalidated object for a value-based exchange in the event that an obtainment restriction applies the SKU code and/or the one or more object attributes "category: restricted substance," "quantity: 1 liter" and one or more user attributes and/or an exchange location do not satisfy the obtainment restrictions.

In some embodiments, the exchange platform may increment a count attribute for each recorded data object that corresponds to a validated object. By way of example, the count attribute for a respective recorded data object may be incremented in response to the validation of an object represented by the recorded data object. In some examples, the count attribute may be one of a plurality of count attributes for the object that enable the exchange platform to aggregate object level insights from across a plurality of a different member platforms, locations, and/or the like.

In some embodiments, the exchange platform may generate a validated exchange data object for the exchange request. The validated exchange data object may be a data object that is indicative of one or more validated objects of a value-based exchange. In some examples, a validated exchange data object may be based at least in part on a comparison between an exchange request and/or one or more user attributes corresponding to the exchange request. In some examples, a validated exchange data object may include a plurality of object identifiers and/or one or more object attributes for one or more validated objects of a value-based exchange.

In some examples, a validated exchange data object may be indicative of an exchange value. The exchange value may be an aggregated value of each of the validated data objects. In some examples, the exchange value may be modified from an initial exchange value, using some of the techniques of the present disclosure, to tailor the exchange value to the validated objects of the value-based exchange.

In some examples, the validated exchange data object may be indicative of one or more object statuses for the one or more validated objects.

In some embodiments, the exchange platform may generate an invalidated exchange data object for the exchange request. The invalidated exchange data object is a data object that is indicative of one or more invalidated objects of a value-based exchange. In some examples, an invalidated exchange data object may be based at least in part on a comparison between an exchange request and one or more user attributes corresponding to the exchange request. For instance, the invalidated exchange data object may be indicative of a plurality of invalidated objects of the value-based exchange. In addition, or alternatively, an invalidated exchange data object may be based at least in part on an exchange request and a validated exchange data object. For example, the invalidated exchange data object may be indicative of a plurality of invalidated objects of the value-based exchange. For instance, the invalidated exchange data object may be indicative of a plurality of objects of the value-based exchange that are not included in the validated exchange data object.

An invalidated exchange data object may include a plurality of object identifiers and/or one or more object attributes for one or more invalidated objects of a value-based exchange. In some examples, the invalidated exchange data object may be indicative of one or more object statuses for the one or more invalidated objects.

FIG. 8 provides a message flow diagram illustrating steps/operations for adjudicating a value-based exchange that is tailored to user attributes associated with a value-based exchange. As will be recognized, the steps/operations of the message flow diagram may be executed and carried out with the corresponding steps/operations of FIGS. 6 and 7.

At step/operation 804, a user 802 initiates a value-based exchange for obtaining a plurality of objects from a partner platform 420 using a service provider instrument maintained by a service provider platform 440.

At step/operation 806, the partner platform 420 provides an exchange request to the exchange platform (e.g., a partner service 410, etc. thereof) for executing the value-based exchange. The exchange request includes an UUEK and is indicative of the plurality of objects. For example, the partner platform 420 may send an exchange request with the UUEK and a plurality of object identifiers to the exchange platform (e.g., a partner service 410, etc. thereof). In some examples, the plurality of object identifiers may include a plurality of SKUs.

At step/operation 808, the exchange platform (e.g., a partner service 410, etc. thereof) provides the UUEK and data indicative of the plurality of objects to a service provider service 412 corresponding to the UUEK. For example, the exchange platform (e.g., a partner service 410, etc. thereof) may call the service provider service 412 with the UUEK and the plurality of object identifiers of the exchange request.

At step/operation 810, the exchange platform (e.g., a service provider service 412, etc. thereof) identifies the service provider instrument and/or the user corresponding to the UUEK. For example, the exchange platform (e.g., a service provider service 412, etc. thereof) may look up the system user data object and the system instrument data object associated with the UUEK.

At step/operation 812, the exchange platform (e.g., a service provider service 412, etc. thereof) determines whether an object validation is required for the value-based exchange based at least in part on the user and/or the service provider instrument. For example, the exchange platform (e.g., a service provider service 412, etc. thereof) may determine, based at least in part on the UUEK, the user, the service provider instrument, and/or the object identifiers of the exchange request whether the object validation is required for the exchange request.

In response to a determination that an object validation is required, at step/operation 814, the exchange platform (e.g., a service provider service 412, etc. thereof) provides data indicative of the user and/or the plurality of objects to a validation service 408. For example, the exchange platform (e.g., a service provider service 412, etc. thereof) may call the validation service 408 with the plurality of object identifiers of the exchange request and a system user data object.

At step/operation 816, the exchange platform (e.g., a validation service 408, etc. thereof) identifies one or more obtainment restrictions corresponding to the plurality of objects and/or the system user data object. For example, the exchange platform (e.g., a validation service 408, etc. thereof) may look up the object identifiers of the exchange request to identify the one or more obtainment restrictions.

At step/operation 818, the exchange platform (e.g., a validation service 408, etc. thereof) validates one or more of the plurality of objects based at least in part on a comparison between the system user data object and the one or more obtainment restrictions. For example, the exchange platform (e.g., a validation service 408, etc. thereof) may validate one or more of the plurality of objects against the one or more obtainment restrictions corresponding to the objects.

At step/operation 820, the exchange platform (e.g., a validation service 408, etc. thereof) provides data indicative of a plurality of validated objects to the service provider service 412. In some examples, the exchange platform (e.g., a validation service 408, etc. thereof) may provide a list of invalidated object identifiers to the service provider service 412 to identify the validated objects (e.g., by differentiating the invalidated objects from the validated objects). For example, the exchange platform (e.g., a validation service 408, etc. thereof) may return a list of ineligible object identifiers for the value-based exchange.

At step/operation 822, the exchange platform (e.g., a service provider service 412, etc. thereof) modifies the exchange value based at least in part on the one or more validated objects. For example, the exchange platform (e.g., a service provider service 412, etc. thereof) may adjust the authorization amount for the service provider platform 440 if applicable (e.g., one or more validated objects) or decline the value-based exchange when appropriate (e.g., no validated objects).

At step/operation 824, the exchange platform (e.g., a service provider service 412, etc. thereof) provides an exchange authorization request to a service provider platform 440. The exchange platform (e.g., a service provider service 412, etc. thereof), for example, may initiate a call (e.g., API call, etc.) to the service provider platform 440 to request authorization for the sum of the eligible objects from the plurality of objects of the exchange request.

At step/operation 826, the service provider platform 440 provides an exchange authorization response to the exchange platform (e.g., a service provider service 412, etc. thereof). The service provider platform 440, for example, may return an authorization decision (e.g., approved, denied, etc.).

At step/operation 828, the exchange platform (e.g., a service provider service 412, etc. thereof) provides the exchange authorization response and/or data indicative of the one or more validated objects to the partner service 410. In some examples, the exchange platform (e.g., a service provider service 412, etc. thereof) may provide a list of invalidated object identifiers to the partner service 410. The exchange platform (e.g., a service provider service 412, etc. thereof), for example, may return an authorization decision and details of the object identifiers (e.g., of the one or more invalidated objects) ineligible for obtaining.

At step/operation 830, the exchange platform (e.g., a partner service 410, etc. thereof) provides an exchange response to the partner platform 420. The exchange response may be indicative of the exchange authorization response and/or the data indicative of the one or more validated objects. In some examples, the exchange platform (e.g., a partner service 410, etc. thereof) may provide a list of invalidated object identifiers to the partner platform 420. For example, the partner service 410 may return an authorization decision and details of the object identifiers (e.g., of the one or more invalidated objects) ineligible for obtaining (e.g., $100 approved, remove alcoholic beverage).

At step/operation 832, the partner platform 420 provides an indication of the exchange response to the user 802. For example, the partner platform 420 may return an authorization decision to the user 802.

VI. Conclusion

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method comprising:

receiving, by one or more processors and using a partner interface, an exchange request for executing a value-based exchange, wherein the exchange request is indicative of (i) a universally unique ephemeral key (UUEK) that comprises an exchange identifier and (ii) a plurality of object identifiers;

identifying, by the one or more processors, an exchange data object based at least in part on the exchange identifier, wherein the exchange data object comprises an instrument identifier for a service provider instrument of a member platform;

identifying, by the one or more processors, a member policy corresponding the member platform based at least in part on the instrument identifier;

determining, by the one or more processors, one or more validated objects and one or more invalidated objects for the exchange request based at least in part on (i) the member policy and (ii) the plurality of object identifiers;

providing, by the one or more processors and using a service provider interface, an exchange authorization request to the member platform, wherein the exchange authorization request is indicative of the instrument identifier and the one or more validated objects for the exchange request;

receiving, by the one or more processors and using the service provider interface, an exchange authorization response that is indicative of at least one of an exchange approval or an exchange denial; and providing, by the one or more processors and using the partner interface, an exchange response based at least in part on the exchange authorization response, wherein the exchange response is indicative of (i) the exchange approval or the exchange denial and (ii) the one or more invalidated objects for the exchange request.

2. The computer-implemented method of claim 1, wherein the exchange request comprises one or more request resolution flags that are indicative of a partial exchange authorization or a full exchange authorization, and wherein providing the exchange authorization request to the member platform comprises:

determining that the one or more request resolution flags are indicative of the partial exchange authorization; and providing the exchange authorization request to the member platform in response to the determination that the one or more request resolution flags are indicative of the partial exchange authorization.

3. The computer-implemented method of claim 1, wherein the plurality of object identifiers correspond to a plurality of objects associated with the value-based exchange.

4. The computer-implemented method of claim 3, wherein the member policy comprises a plurality of authorized object identifiers and determining the one or more validated objects and the one or more invalidated objects for the exchange request comprises:

determining the one or more validated objects based at least in part on a comparison between the plurality of object identifiers and the plurality of authorized object identifiers; and determining the one or more invalidated objects based at least in part on a comparison between the one or more validated objects and the plurality of objects associated with the value-based exchange.

5. The computer-implemented method of claim 3, wherein the member policy comprises a plurality of authorized object attributes and determining the one or more validated objects and the one or more invalidated objects for the exchange request comprises:

identifying a plurality of recorded data objects corresponding to the plurality of object identifiers, wherein a recorded data object comprises a plurality of object attributes for an object;

determining the one or more validated objects based at least in part on a comparison between the plurality of recorded data objects and the plurality of authorized object attributes; and determining the one or more invalidated objects based at least in part on a comparison between the one or more validated objects and the plurality of objects associated with the value-based exchange.

6. The computer-implemented method of claim 5, wherein the plurality of object attributes comprise at least one of a spatial attribute, a count attribute, a value attribute, a source attribute, a composition attribute, or a categorical attribute.

7. The computer-implemented method of claim 6 further comprising incrementing the count attribute for the object in response to the exchange request.

8. The computer-implemented method of claim 1, wherein the member policy is identified based at least in part on the member platform and a location associated with the exchange request.

9. The computer-implemented method of claim 8, wherein the location comprises an exchange location and the exchange request is indicative of the exchange location.

10. The computer-implemented method of claim 1, wherein the exchange request comprises a plurality of object values corresponding to a plurality of objects associated with the value-based exchange and initial exchange value for the plurality of objects, and wherein the computer-implemented method further comprises:

determining an exchange value for the value-based exchange by modifying the initial exchange value based at least in part on one or more of the plurality of object values that correspond to the one or more validated objects; and providing, using the service provider interface, the exchange authorization request to the member platform, wherein the exchange authorization request is indicative of the exchange value.

11. A computing system comprising memory and one or more processors communicatively coupled to the memory, the one or more processors configured to:

receive, using a partner interface, an exchange request for executing a value-based exchange, wherein the exchange request is indicative of (i) a universally unique ephemeral key (UUEK) that comprises an exchange identifier and (ii) a plurality of object identifiers;

identify, an exchange data object based at least in part on the exchange identifier, wherein the exchange data object comprises an instrument identifier for a service provider instrument of a member platform;

identify a member policy corresponding the member platform based at least in part on the instrument identifier;

determine one or more validated objects and one or more invalidated objects for the exchange request based at least in part on (i) the member policy and (ii) the plurality of object identifiers;

provide, using a service provider interface, an exchange authorization request to the member platform, wherein the exchange authorization request is indicative of the instrument identifier and the one or more validated objects for the exchange request;

receive, using the service provider interface, an exchange authorization response that is indicative of at least one of an exchange approval or an exchange denial; and provide, using the partner interface, an exchange response based at least in part on the exchange authorization response, wherein the exchange response is indicative of (i) the exchange approval or the exchange denial and (ii) the one or more invalidated objects for the exchange request.

12. The computing system of claim 11, wherein the exchange request comprises one or more request resolution flags that are indicative of a partial exchange authorization or a full exchange authorization, and wherein providing the exchange authorization request to the member platform comprises:

determining that the one or more request resolution flags are indicative of the partial exchange authorization; and providing the exchange authorization request to the member platform in response to the determination that the one or more request resolution flags are indicative of the partial exchange authorization.

13. The computing system of claim 11, wherein the plurality of object identifiers correspond to a plurality of objects associated with the value-based exchange.

14. The computing system of claim 13, wherein the member policy comprises a plurality of authorized object identifiers and determining the one or more validated objects and the one or more invalidated objects for the exchange request comprises:

determining the one or more validated objects based at least in part on a comparison between the plurality of object identifiers and the plurality of authorized object identifiers; and determining the one or more invalidated objects based at least in part on a comparison between the one or more validated objects and the plurality of objects associated with the value-based exchange.

15. One or more non-transitory computer-readable storage media including instructions that, when executed by one or more processors, cause the one or more processors to:

receive, using a partner interface, an exchange request for executing a value-based exchange, wherein the exchange request is indicative of (i) a universally unique ephemeral key (UUEK) that comprises an exchange identifier and (ii) a plurality of object identifiers;

identify, an exchange data object based at least in part on the exchange identifier, wherein the exchange data object comprises an instrument identifier for a service provider instrument of a member platform;

identify a member policy corresponding the member platform based at least in part on the instrument identifier;

determine one or more validated objects and one or more invalidated objects for the exchange request based at least in part on (i) the member policy and (ii) the plurality of object identifiers;

provide, using a service provider interface, an exchange authorization request to the member platform, wherein the exchange authorization request is indicative of the instrument identifier and the one or more validated objects for the exchange request;

receive, using the service provider interface, an exchange authorization response that is indicative of at least one of an exchange approval or an exchange denial; and provide, using the partner interface, an exchange response based at least in part on the exchange authorization response, wherein the exchange response is indicative of (i) the exchange approval or the exchange denial and (ii) the one or more invalidated objects for the exchange request.

16. The one or more non-transitory computer-readable storage media of claim 15, wherein the exchange request comprises a plurality of object values corresponding to a plurality of objects associated with the value-based exchange and an initial exchange value for the plurality of objects, and wherein the one or more processors are further caused to:

determining an exchange value for the value-based exchange by modifying the initial exchange value based at least in part on one or more of the plurality of object values that correspond to the one or more validated objects; and providing, using the service provider interface, the exchange authorization request to the member platform, wherein the exchange authorization request is indicative of the exchange value.

17. The one or more non-transitory computer-readable storage media of claim 15, wherein the exchange request comprises one or more request resolution flags that are indicative of a partial exchange authorization or a full exchange authorization, and wherein providing the exchange authorization request to the member platform comprises:

determining that the one or more request resolution flags are indicative of the partial exchange authorization; and providing the exchange authorization request to the member platform in response to the determination that the one or more request resolution flags are indicative of the partial exchange authorization.

18. The one or more non-transitory computer-readable storage media of claim 15, wherein the plurality of object identifiers corresponding to a plurality of objects associated with the value-based exchange.

19. The one or more non-transitory computer-readable storage media of claim 18, wherein the member policy comprises a plurality of authorized object identifiers and determining the one or more validated objects and the one or more invalidated objects for the exchange request comprises:

determining the one or more validated objects based at least in part on a comparison between the plurality of object identifiers and the plurality of authorized object identifiers; and determining the one or more invalidated objects based at least in part on a comparison between the one or more validated objects and the plurality of objects associated with the value-based exchange.

20. The one or more non-transitory computer-readable storage media of claim 18, wherein the member policy comprises a plurality of authorized object attributes and determining the one or more validated objects and the one or more invalidated objects for the exchange request comprises:

identifying a plurality of recorded data objects corresponding to the plurality of object identifiers, wherein a recorded data object comprises a plurality of object attributes for an object;

determining the one or more validated objects based at least in part on a comparison between the plurality of recorded data objects and the plurality of authorized object attributes; and determining the one or more invalidated objects based at least in part on a comparison between the one or more validated objects and the plurality of objects associated with the value-based exchange.

* * * * *